(12) United States Patent
Angrish et al.

(10) Patent No.: US 11,769,139 B2
(45) Date of Patent: Sep. 26, 2023

(54) MOBILE PAYMENTS INTEGRATED WITH A BOOKING SYSTEM

(71) Applicant: OpenTable, Inc., San Francisco, CA (US)

(72) Inventors: Rohan Angrish, Mumbai (IN); Rishi Deshpande, Mumbai (IN); Kashyap Deorah, Mumbai (IN); Tapan Pandita, Mumbai (IN); Ulhas Mandrawadkar, Mumbai (IN); Keshav Krity, Mumbai (IN); Sanjay Dalsania, Mumbai (IN); Abhay Kumar, Mumbai (IN); Dave Arthurs, San Francisco, CA (US)

(73) Assignee: OpenTable, Inc., San Francisco, CA (US)

( * ) Notice: Subject to any disclaimer, the term of this patent is extended or adjusted under 35 U.S.C. 154(b) by 305 days.

(21) Appl. No.: 17/074,434

(22) Filed: Oct. 19, 2020

(65) Prior Publication Data
US 2021/0103911 A1 Apr. 8, 2021

Related U.S. Application Data

(63) Continuation of application No. 16/177,047, filed on Oct. 31, 2018, now Pat. No. 10,810,576, which is a (Continued)

(30) Foreign Application Priority Data

Dec. 19, 2013 (IN) .......................... 1437/KOL/2013
Feb. 6, 2014 (IN) .......................... 155/KOL/2014

(51) Int. Cl.
*G06Q 20/32* (2012.01)
*G06Q 50/12* (2012.01)
(Continued)

(52) U.S. Cl.
CPC .......... *G06Q 20/327* (2013.01); *G06Q 10/02* (2013.01); *G06Q 20/20* (2013.01); *G06Q 20/209* (2013.01); *G06Q 20/322* (2013.01); *G06Q 50/12* (2013.01)

(58) Field of Classification Search
CPC ...... G06Q 20/327; G06Q 20/20; G06Q 10/02; G06Q 50/12; G06Q 20/209; G06Q 20/322; G06Q 20/326
(Continued)

(56) References Cited

U.S. PATENT DOCUMENTS 7,069,228 B1 6/2006 Rose et al.
8,224,700 B2 7/2012 Silver
(Continued)

FOREIGN PATENT DOCUMENTS

WO WO 2012112882 8/2012

OTHER PUBLICATIONS

Anonymous: "PayPal Expends Offline With EatNow and OrderMate—Power Retail", dated Jul. 19, 2013, from the internet: http//www.powerretail.com.au/news/paypalexpands-offline-with-eat now, 7 pages.
(Continued)

*Primary Examiner* — Igor N Borissov
(74) *Attorney, Agent, or Firm* — Fish & Richardson P.C.

(57) ABSTRACT

Techniques for mobile payments integrated with a booking system are described. In an embodiment, a method includes: receiving a request from a computing device of a user to pay a ticket open at a merchant point-of-sale computer, obtaining a current total ticket amount for the ticket from the merchant point-of-sale computer, determining an estimated total ticket amount based at least in part on the current total ticket amount, authorizing but not capturing payment of the estimated total ticket amount with a payment network gateway computer, after the ticket is closed at the merchant point-
(Continued)

of-sale computer, obtaining a final total ticket amount for the ticket from the merchant point-of-sale computer, and capturing payment of the final total ticket amount with the payment network gateway computer.

19 Claims, 30 Drawing Sheets

Related U.S. Application Data continuation of application No. 14/268,145, filed on May 2, 2014, now Pat. No. 10,157,380.

(51) Int. Cl.
*G06Q 20/20* (2012.01)
*G06Q 10/02* (2012.01)

(58) Field of Classification Search
USPC .......................................................... 705/5, 6
See application file for complete search history.

(56) References Cited

U.S. PATENT DOCUMENTS

| | | | |
|---|---|---|---|
| 10,692,067 B2 | 6/2020 | Angrish et al. | |
| 2002/0194078 A1 | 12/2002 | Villaret et al. | |
| 2005/0065851 A1* | 3/2005 | Aronoff | G06Q 50/12 705/15 |
| 2005/0267787 A1 | 12/2005 | Rose et al. | |
| 2006/0095434 A1 | 5/2006 | McCullough et al. | |
| 2008/0010105 A1 | 1/2008 | Rose et al. | |
| 2008/0077454 A1 | 3/2008 | Shepherd et al. | |
| 2008/0147450 A1 | 6/2008 | Mortimore | |
| 2008/0284562 A1 | 11/2008 | Arthurs et al. | |
| 2010/0082481 A1 | 4/2010 | Lin et al. | |
| 2011/0191196 A1 | 8/2011 | Orr et al. | |
| 2011/0246247 A1 | 10/2011 | McCullough et al. | |
| 2012/0166232 A1 | 6/2012 | Neubardt | |
| 2012/0173310 A1 | 7/2012 | Groetzinger et al. | |
| 2012/0185561 A1* | 7/2012 | Klein | H04L 67/145 709/217 |
| 2012/0215573 A1 | 8/2012 | Sussman et al. | |
| 2013/0013350 A1 | 1/2013 | McCullough et al. | |
| 2013/0138518 A1 | 5/2013 | White et al. | |
| 2013/0238455 A1 | 9/2013 | Laracey | |
| 2014/0058902 A1 | 2/2014 | Taylor et al. | |
| 2018/0012216 A1 | 1/2018 | Angrish et al. | |

OTHER PUBLICATIONS

Claims in application No. PCT/2014/065261, dated Feb. 2015, 10 pages.
Hong, Kaylene, "Online Reservation Service OpenTable Starts Testing Mobile Payments for Diners to Pay Checks In-App", dated Jul. 13, 2013, 4 pages.
Miller, Bryan, wsj.com, "How Mobile Technology is Changing the Way We Dine Out", dated Oct. 25, 2013, 6 pages.
The International Searching Authority, "Search Report" in application No. PCT /US2014/065261, dated Feb. 5, 2015, 13 pages.
Youtube.com, "Android App Overview", dated Jan. 24, 2013, from the internet http://www/youtube.com/watch?v=hyz91n8VShs, 1 page.

* cited by examiner

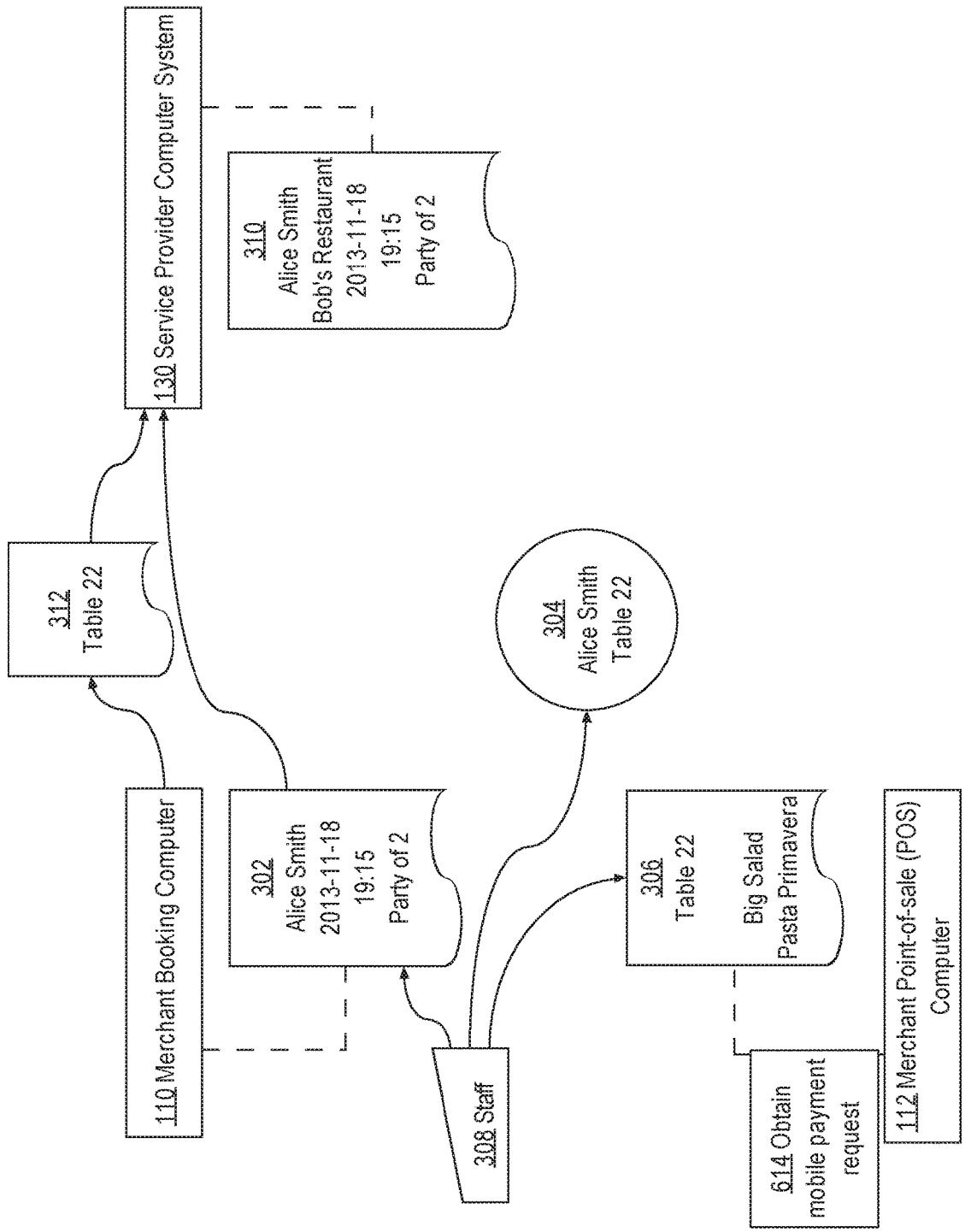

← 800A

| Cowans C | Tbl 11/1 | OT11<br>Chk 7264 | Gst 2 |
|---|---|---|---|

| | | | |
|---|---:|---:|---|
| 2 Sparkling Water | 8.00 | 1 | * |
| 1 Oyster | 12.00 | 1 | * |
| 1 Trad Onion Soup | 9.00 | 1 | * |
| 1 May pay w/ OT | 0.00 | 1 | * |
| 1 Filet Mignon | 28.00 | 1 | * |
| 1 Salmn Fennel | 23.00 | 1 | * |
| Tip: 20% | | 1 | * |
| 1 OTPay Authed | 0.00 | | * |
| 1 Strawberry Savar | 6.00 | 1 | * |
| 1 Flan | 6.00 | 1 | * |

| | |
|---|---:|
| Subtotal | 92.00 |
| Tax | 7.22 |
| Service Chrg | 0.00 |
| Payment | 0.00 |
| Eat In Ttl | 99.22 |

| Cowans C | Tbl 11/1 | OT11<br>Chk 7264 | Gst 2 |
|---|---|---|---|
| Regular | Reg | DEMO | |

| | | |
|---|---:|---:|
| 2 Sparkling Water | 8.00 | 1 |
| 1 Oyster | 12.00 | 1 |
| 1 Trad Onion Soup | 9.00 | 1 |
| 1 May pay w/OT | 0.00 | 1 |
| 1 Filet Mignon | 28.00 | 1 |
| 1 Salmn Fennel | 23.00 | 1 |
| Tip: 20% | | 1 |
| 1 OTPay Authed | 0.00 | |
| 1 Strawberry Savar | 6.00 | 1 |
| 1 Flan | 6.00 | 1 |
| 1 OTPay Processing | 0.00 | 1 |
| 1 OT PAID | 0.00 | 1 |
| Tip | | 1 |
|   Charge Tip | 19.84 | |
| OpenTable | 119.06 | 1 |

| | |
|---|---:|
| Subtotal | 92.00 |
| Tax | 7.22 |
| Service Chrg | 19.84 |
| Payment | 119.06 |
| Eat In Ttl | 0.00 |

FIG. 8B

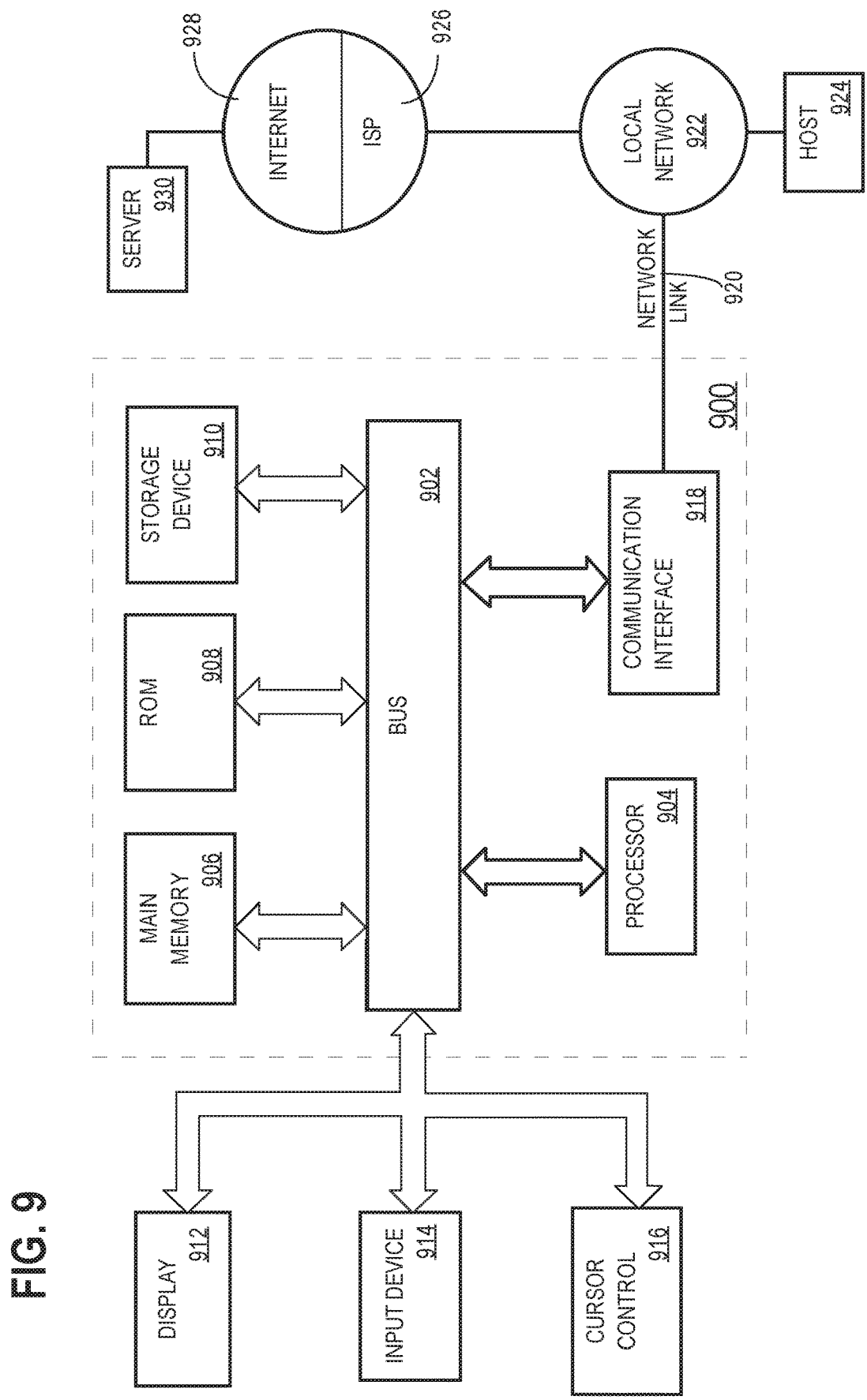

MOBILE PAYMENTS INTEGRATED WITH A BOOKING SYSTEM

PRIORITY CLAIM

This application claims the benefit under 35 USC 120 as a continuation of U.S. application Ser. No. 16/177,047, filed Oct. 31, 2018, which claims the benefit under 35 USC 120 as a continuation of U.S. application Ser. No. 14/268,145, filed May 2, 2014, now U.S. Pat. No. 10,157,380, which claims the benefit under 35 USC 119 of India application 155/KOL/2014, filed Feb. 6, 2014 and India application 1437/KOL/2013, filed Dec. 19, 2013, the entire contents of each of which is hereby incorporated by reference for all purposes as if fully set forth herein.

FIELD OF THE DISCLOSURE

The present disclosure generally relates to data processing in the field of electronic payments. The disclosure relates more specifically to computer-implemented techniques for managing payments for experiences, such as restaurant dining, in coordination with a booking system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Settlement of bills at the end of service can be time-consuming and inconvenient for customers of restaurants or other entities. For example, when diners complete a meal, typically they wish to leave the restaurant relatively rapidly, but the need to interact with restaurant service staff to complete payment can interpose delays. In particular, diners who pay using payment cards such as credit cards or debit cards typically must interact with service staff at least two and often three times in order to receive the bill, present a payment card, and receive a receipt specifying a completed payment. If the bill or receipt contains an error, then additional interactions may be necessary. Similar issues can arise in the context of payment for experiences other than restaurant diners.

SUMMARY

The appended claims may serve as a summary of the invention.

BRIEF DESCRIPTION OF THE DRAWINGS

In the drawings:

FIG. 3 illustrates mappings of reservation records, guest checks and database records in some embodiments FIG. 4A

FIGS. 8A and 8B depict example screen displays that a point-of-sale application may generate and display using a merchant point-of-sale computer, according to some embodiments of the invention.

FIG. 9 is a block diagram that illustrates a computer system 900 upon which some embodiments of the invention may be implemented.

DETAILED DESCRIPTION

Figure 1:
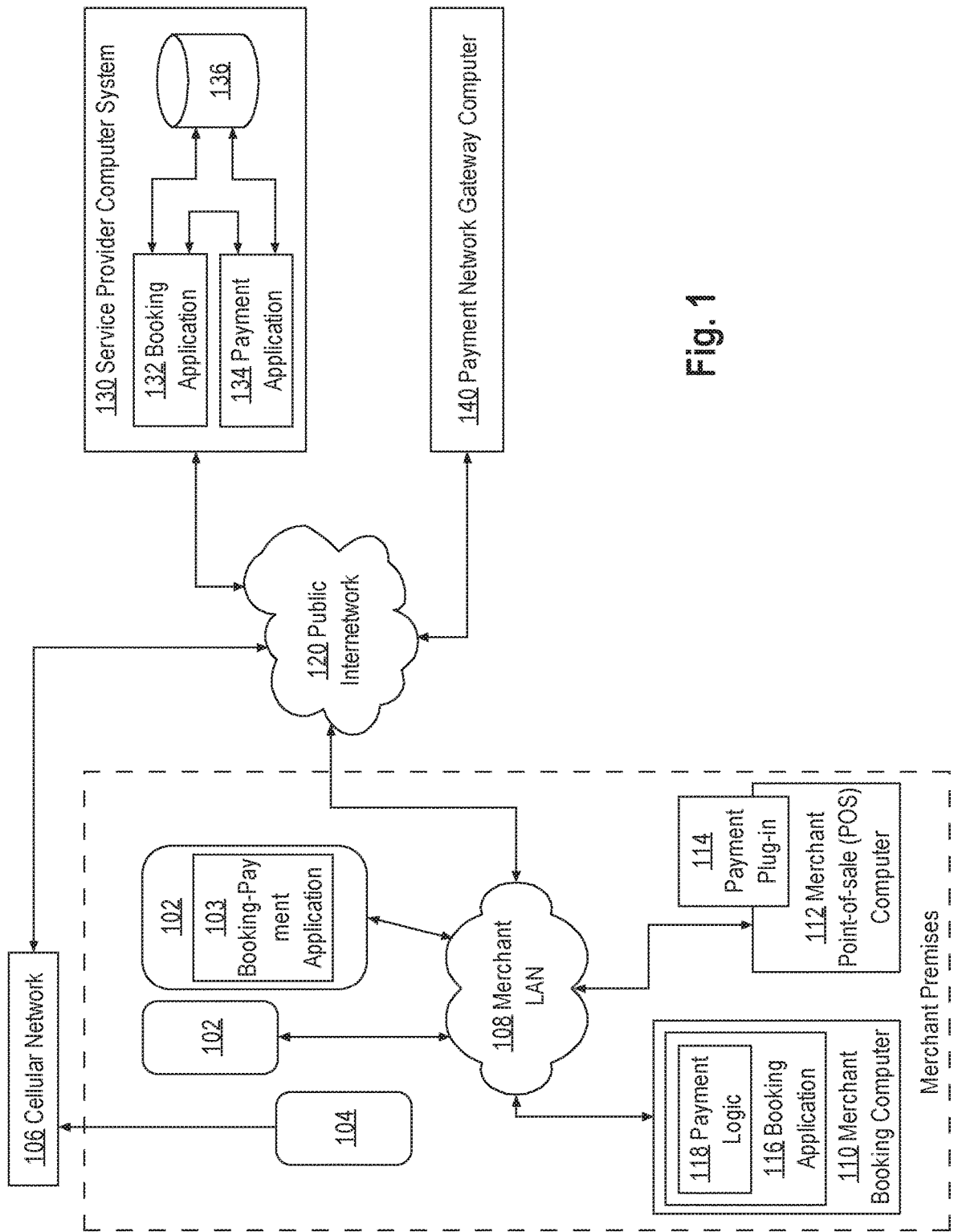
FIG. 1 illustrates a networked computer environment in which some embodiments of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Overview

Various embodiments encompass the subject matter of the following numbered clauses:

1. In a service provider computer system operatively coupled to a computing device of a user and a merchant point-of-sale computer by one or more data networks, a method comprising: receiving a request from the computing device of the user to pay a ticket open at the merchant point-of-sale computer; obtaining a current total ticket amount for the ticket from the merchant point-of-sale computer; determining an estimated total ticket amount based at least in part on the current total ticket amount; authorizing but not capturing payment of the estimated total ticket amount with a payment network gateway computer; after the ticket is closed at the merchant point-of-sale computer, obtaining a final total ticket amount for the ticket from the merchant point-of-sale computer; and capturing payment of the final total ticket amount with the payment network gateway computer.

2. The method of claim 1, wherein obtaining the current total ticket amount for the ticket and obtaining the final total ticket amount for the ticket from the merchant point-of-sale computer is facilitated by a plug-in to the merchant point-of-sale computer.

3. The method of claim 1, wherein authorizing but not capturing payment of the estimated total ticket amount comprises obtaining a payment authorization identifier from the payment network gateway computer; and wherein capturing payment of the final total ticket comprises providing the payment authorization identifier to the payment network gateway computer.

4. The method of claim 1, wherein the final total ticket amount is greater than the estimated total ticket amount; and wherein capturing payment of the final total ticket amount comprises: releasing the payment authorization of the estimated total ticket amount with the payment network gateway computer; and authorizing and capturing payment of the final total ticket amount with the payment network gateway computer.

5. The method of claim 1, wherein the final total ticket amount is greater than the estimated total ticket amount; and wherein capturing payment of the final total ticket amount comprises: capturing payment of the estimated total ticket amount with the payment network gateway computer; and authorizing and capturing payment of an amount equal to the difference between the final total ticket amount and the estimated total ticket amount with the payment network gateway computer.

6. The method of claim 1, wherein the final total ticket amount is greater than the estimated total ticket amount; and wherein capturing payment of the final total ticket amount comprises: without releasing authorization of payment for the estimated total ticket amount with the payment network gateway computer, authorizing but not capturing payment of the final total ticket amount with the payment network gateway computer; and in response to detecting successful capture of payment of the final total ticket amount with the payment network gateway computer, releasing authorization of the payment for the estimated total ticket amount with the payment network gateway computer.

7. The method of claim 1, further comprising: matching ticket data for the ticket obtained from the merchant point-of-sale computer to a reservation record for the user.

8. The method of claim 1, further comprising: receiving seating information for the ticket from the merchant point-of-sale computer; and matching ticket data for the ticket obtained from the merchant point-of-sale computer to a reservation record for the user based at least in part on the seating information for the ticket.

9. The method of claim 1, further comprising: receiving ticket creation time information for the ticket from the merchant point-of-sale computer; and matching ticket data for the ticket obtained from the merchant point-of-sale computer to a reservation record for the user based at least in part on the ticket creation time information.

10. The method of claim 1, further comprising: receiving a tip or gratuity amount or percentage from the computing device of the user; and determining the estimated total ticket amount based at least in part on the tip or gratuity amount or percentage.

11. The method of claim 1, further comprising determining the estimated total ticket amount based at least in part on one or more ticket amounts for one or more past tickets for the user.

12. The method of claim 1, further comprising determining the estimated total ticket amount based at least in part on one or more ticket amounts for one or more past tickets for one or more other users.

13. The method of claim 1, further comprising: before receiving the request from the computing device of the user to pay the ticket, matching ticket data for the ticket obtained from the merchant point-of-sale computer to a reservation record for the user; and, based on the matching, causing the ticket data for the ticket to be provided the computing device of the user.

14. In a plug-in to a merchant point-of-sale computer, the plug-in operatively coupled to a service provider computer system via one or more data networks, a method comprising: obtaining ticket data for one or more tickets from an application programming interface offered at the merchant point-of-sale computer; providing the ticket data to the service provider computer system; and in response to obtaining an indication from the service provider computer system that a particular ticket of the one or more tickets is designated for mobile payment, using the application programming interface to mark the particular ticket as designated for mobile payment.

15. The method of claim 14, wherein using the application programming interface to mark the particular ticket as designated for mobile payment comprises using the application programming interface to add a ticket item to the at least one ticket indicating the particular ticket as designated for mobile payment.

16. The method of claim 14, wherein using the application programming interface to mark the particular ticket as designated for mobile payment comprises using the application programming interface to rename the particular ticket with a name indicating the particular ticket as designated for mobile payment.

2.0 Structural and Functional Overview 2.1 Networked Computer System Example

FIG. 1 illustrates a networked computer environment in which an embodiment may be implemented. FIG. 1 represents one example embodiment that is provided for purposes of illustrating a clear example; other embodiments may use different arrangements.

In some embodiments, a plurality of mobile computing devices 102 is coupled using wireless links to a merchant local area network (LAN) 108 within the premises of a merchant. In this arrangement, the mobile computing devices 102 are communicatively coupled both directly to the merchant LAN 108 and indirectly to a public internetwork 120. In some embodiments, the merchant premises is a restaurant, but the techniques described herein also are usable in other contexts and use in dining or restaurant applications is not required.

One or more other mobile computing devices 104 may be coupled wirelessly through a cellular network 106 to public internetwork 120. Merchant LAN 108 may be implemented using wired or wireless links, and may include a WAN gateway to other merchant sites, management centers or data centers. Network 120 broadly represents one or more LANs, WANs, and/or internetworks using any of wired, wireless, terrestrial, microwave or satellite links, and may include the public Internet.

Mobile computing devices 102, 104 of FIG. 1 broadly represent any of smartphones, tablet computers, other handheld computers, laptop computers, netbook computers, and ultrabook computers. Examples include IPHONE, IPAD or other APPLE IOS devices, ANDROID devices, and MICROSOFT WINDOWS devices.

As shown for one mobile computing device 102, each of the devices 102, 104 may host or execute a booking-payment application (also referred to herein as "mobile application", "mobile app", or just "app") 103, the functions of which are further described herein. In general, in the context of a restaurant, the app 103 is configured to receive table booking data, display existing table bookings, facilitate searching for available tables, facilitate searching for data relating to restaurants, display an open check or completed check for a particular party and table at a particular restaurant, and/or facilitate authorizing payment of the check using a payment card or payment account.

Functionality equivalent to functionality provided by app 103 when executed on a mobile computing device 102 or 104 can be provided by an application that executes with the aid of conventional web browser software (e.g., INTERNET EXPLORER, SAFARI, OPERA, GOOGLE CHROME, MOZILLA FIREFOX) executing on a mobile computing device 102 or 104. Thus, implementations of app 103 include, but are not limited to, application software designed to run on a mobile computing device 102 or 104 and application software designed to run with the aid of conventional web browser software on a mobile computing device 102 or 104.

Merchant LAN 108 also may be coupled to a merchant booking computer 110 and a merchant point-of-sale (POS) computer 112. In some embodiments, merchant booking computer 110 hosts or executes a booking application 116 having payment logic 118. A non-limiting example of a commercially available embodiment of the booking application 116 is the Electronic Reservation Book (ERB) of OpenTable, Inc., San Francisco, Calif.

Functions of the booking application 116 and payment logic 118 are compatible with features of the booking-payment app 103, and are described further in other sections herein. In general, the booking application is configured to communicate with a compatible server-based booking service to receive data relating to online table bookings, and is configured to receive data indicating a table at which a party is seated. In general, payment logic 118 is configured to communicate table seating locations of seated parties to the booking application 132 and/or payment application 134 of the service provider computer system 130 to enable using those table locations as a basis to retrieve POS check data. In general, payment plug-in 114 is configured to receive and respond to requests of the server-based payment application 134 to interact with the merchant POS computer 112 to obtain check data, to modify or mark check data, and to interoperate with the server-based booking service to facilitate payment of checks.

In some embodiments, the merchant POS computer 112 is configured to perform point of sale functions such as, in the context of a restaurant, opening guest tickets or guest checks, entering orders for food, beverage or merchandise, revising or canceling orders, printing guest checks, associating guest checks with table numbers, and similar functions. Non-limiting examples of commercially available merchant POS systems that can be used as computer 112 include MICROS and ALOHA.

In some embodiments, the payment plug-in 114 is integrated with the merchant POS computer 112 and is configured to query the POS computer to obtain data requested in the requests, and to provide responses to the booking application with data responsive to the requests. In one approach, the payment plug-in 114 is POS-specific and is installed at the restaurant to process check viewing as well as check closing.

Typically restaurants use a variety of POS systems. In some embodiments, POS plug-in program calls are abstracted into a set of generic calls so that the payment application 134 can be written using the generic calls without the need to communicate in a POS-specific manner. The generic calls communicate all messages and data between the service provider computer system 130 and payment plug-in 114 that are described herein, and at the plug-in, POS-specific libraries are configured to make POS-specific translations of requests, messages and data just before the requests are sent to the merchant POS computer 112. Similarly, the payment plug-in 114 is configured to transform responses and query results received from the merchant POS computer 112 to a generic format prior to communication to service provider computer system 130. As a result, the service provider computer system 130 can communicate with all restaurants at which a plug-in is installed to read as well as close checks.

In some embodiments, functionality for communicating messages and data between merchant POS computer 112 and service provider computer system 130 is integrated into merchant POS computer 112 and/or software executing thereon. In some embodiments, a payment plug-in 114 is not used. Thus, a function, step, and act described herein as being performed by payment plug-in 114 may instead be performed, or may be performed in part, by merchant POS computer 112 and/or software executing thereon.

In some embodiments, a service provider computer system 130 and a payment network gateway computer 140 also are coupled to network 120. In some embodiments, the service provider computer system 130 comprises one or more computers, virtual machine instances, and/or data centers that are configured to host or execute one or more instances of a booking application 132, payment application 134, and database 136. In some embodiments, booking application 132 may be integrated with the payment application 134 and separate units are not required.

In general, booking application 132 is configured to receive and reply to queries from booking-payment application 103 relating to available tables, restaurant details, menus, and similar data, to generate reminder messages, to provide booking data to booking application 116, and to provide booking data and/or data received from the booking application to the payment application 134.

In general, the payment application 134 is configured to receive instructions from payment logic and/or booking-payment application 103 to pay the amount of a guest check and to initiate a payment transaction in a payment network by sending messages or instructions to payment network gateway computer 140. For purposes of clarity, the payment network gateway computer 140 broadly represents elements of an online payment network without unnecessary details relating to accepting bank computers and other elements. Generally, payment network gateway computer 140 may be any electronic payment system for transferring monetary value (e.g., United States Dollars) or digital currency (e.g., BITCOIN) between parties discharging mutual obligations including, but not limited to, debit card systems, credit card systems, electronic fund transfer systems, direct credit systems, direct debit systems, internet banking systems, peer-to-peer payment systems, and e-c commerce payment systems. Non-limiting commercially available examples of payment network gateway computer 140 include the STRIPE card payment system from Stripe, San Francisco, Calif. and the SQUARE REGISTER card payment system from Square, San Francisco, Calif.

In some embodiments, merchant LAN 108 may include or incorporate a firewall or other protective computing device that regulates the entry of messages, requests or command from computers that are on or outside of the public internetwork 120. As a result, typically the service provider computer system 130 cannot issue HyperText Transfer Protocol (HTTP)-based calls to the payment logic 118, payment plug-in 114, or other functional units of the merchant booking computer 110 and/or merchant POS computer 112. Therefore, in some embodiments, the elements of FIG. 1 are configured to use socket level third party protocols and messaging systems to communicate with the merchant POS computer 112 and other units that are behind firewalls.

In some embodiments, HTTP long polling is used to implement a publish-subscribe mechanism. In some embodiments, payment plug-in 114, which resides on the merchant POS computer 112 within the restaurant firewall, subscribes to a channel that is hosted by a third-party server such as the service provider computer system 130. The booking application 132 and/or payment application 134 of computer system 130 sends messages to the in-restaurant POS plug-in 114 by publishing to this channel. The PUBNUB service available from PubNub of San Francisco, Calif. is an example of one third-party service providing this functionality.

For purposes of illustrating a clear example, FIG. 1 shows one or a limited number of each element that has been previously described, and practical embodiments or commercial implementations of the techniques herein may use many instances of various elements. For example, there may be thousands of merchant premises and each merchant premises may include many POS computer terminals coupled to one or more POS server computers. There may be thousands or millions of mobile computing devices 102, 104 distributed across the thousands of merchant premises.

The arrangement of FIG. 1 may implement a mobile payment solution that is integrated with a reservation making system to facilitate settlement of restaurant bills via a mobile device. In various embodiments as further described herein, diners using mobile computing devices 102, 104 can make reservations at restaurants such as the merchant premises of FIG. 1 using online portals provided via service provider computer system 130 such as OpenTable.com available, for instance, on the web or via the mobile application 103.

In some embodiments, a mobile payment solution integrated with the reservation process as described herein can enable a diner to settle the restaurant bill directly from the application 103, potentially without requiring any interaction with the restaurant staff In some embodiments, one or more of the app 103, booking application 116, and booking application 132 may obtain all data necessary to identify the diner and the diner's check. The disclosure provides an end-to-end data flow that introduces a novel payment experience generally beginning with an online reservation and ending with a settled restaurant bill, all experienced from within the mobile application 103.

Figure 2:
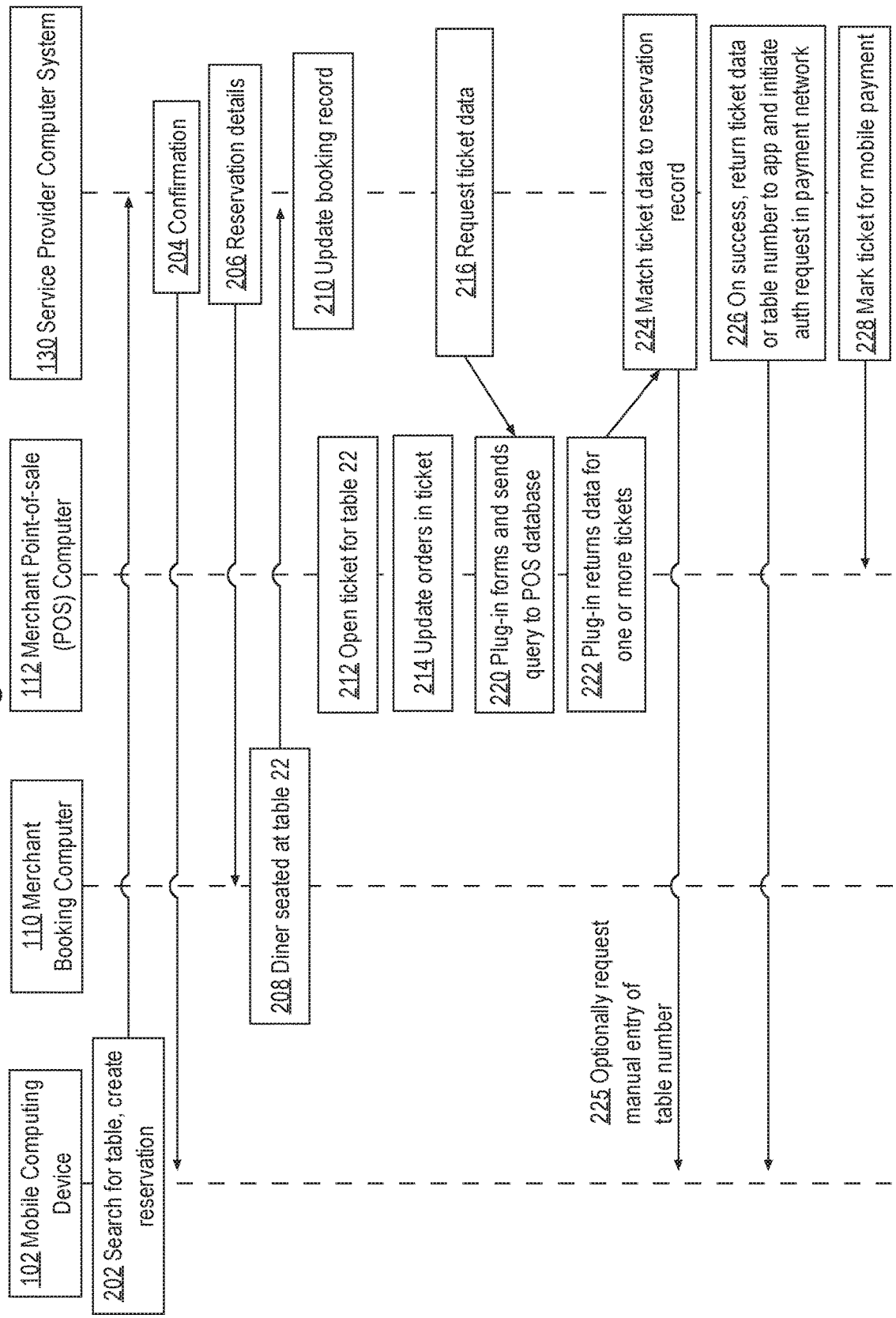
FIG. 2 illustrates data messages that may be communicated between a mobile computing device, merchant booking computer, merchant POS computer, and service provider computer to perform certain techniques including payment using the mobile device, according to some embodiments of the invention.

2.2 Example Dining Transaction with Automatic Mapping of a Ticket on a Restaurant POS System to a Payment Enabled Diner's Reservation FIG. 2 illustrates data messages that may be communicated between a mobile computing device, merchant booking computer, merchant POS computer, and service provider computer to perform certain techniques including payment using the mobile device. FIG. 3 illustrates mappings of reservation records, guest checks and database records in some embodiments.

For purposes of illustrating a clear example, in the context of restaurants and diners, assume that a mobile computing device 102 is associated with a diner. Referring first to FIG. 2, at block 202, the mobile computing device searches for a table and creates a reservation.

For example, using mobile app 103, or using a web browser with another computing device, the diner establishes a data connection to service provider computer system 130 and searches database 136 for an available table at a restaurant in a particular location and completes a reservation record to result in booking a table for a meal.

Assume, for purposes of an example, that a diner named Alice Smith books a table at Bob's Restaurant on 11/18/2013 at 19:15 for a party of 2. As a result, service provider computer system 130 creates and stores record 310 (FIG. 3) that associates Alice Smith, Bob's Restaurant, 2013-11-18, 19:15, and a party of 2.

Record 310 may also be associated with a reservation identifier (Reservation ID) that identifies the reservation and record 310. In some implementations, the reservation identifier by itself uniquely identifies the record 310 from other reservation records created and stored by service provider computer system 130. In other implementations, the reservation identifier in combination with other information in the record 310 uniquely identifies the record 310 from other reservation records. For example, record 310 may be uniquely identified by a combination of the Reservation ID, an identifier of the diner, and/or an identifier of the restaurant.

In some embodiments, the service provider computer system 130 may send a confirmation message at block 204 to the mobile computing device 102.

At block 206, the service provider computer system 130 sends or otherwise provides reservation details in record 310 to Bob's Restaurant. As a result, the merchant booking computer 110 at Bob's Restaurant creates and stores a record 302 with the reservation details. Record 302 may include, but is not limited to, such information as the Reservation ID, an identifier of the diner (e.g., a name (e.g., "Alice Smith"), a phone number, an e-mail address, or other user or diner identifier), the reservation time (e.g., "2013-11-18, 19:15), and the size of the party (e.g., "Party of 2")

Around the time of the reservation, the diner arrives at the merchant premises. Restaurant staff selects a table and seats the diner at the table; assume for this example that Alice's party is seated at table 22 as shown by circle 304. Typically the restaurant staff 308 uses the merchant booking computer 110 to determine which table to use for seating, and as seen at block 208, when the diner is seated, the merchant booking computer forms and sends a message 312 (FIG. 3) to the service provider computer system 130 providing the table number. In addition to or instead of the table number, message 312 may include other reservation arrival details for use by service provider computer system 130. For example, message 312 may include the Reservation ID, an identifier of the restaurant, the reservation time, the actual seating/arrival time, an identifier of the diner, the actual size of the seated party, and/or the reserved size of the party.

In some embodiments, payment logic 118 may report a table number and/or other reservation details to the service provider computer system 130, to any of the booking application 132 or payment application 134. In response, at block 210 the service provider computer system 130 updates record 310 to include the table number and/or other reservation details included in message 312.

The staff typically also separately will create a new customer ticket or check 306 using the merchant POS computer 112, as seen at block 212, and may specify the table number. At this point, the service provider computer system 130 may have associated reservation identifying information for the diner and a table number that was received from the merchant booking computer 110, and the merchant POS computer 112 may store a ticket or check number in association with a table number but without data identifying the reservation. In some embodiments, the record 310 at system 130 for Alice Smith may be marked as unpaid or open for payment.

Assume now that Alice Smith orders the Big Salad and her companion orders Pasta Primavera; the restaurant staff enters the order only in the merchant POS computer 112, and the check 306 in the POS computer is updated with the order at block 214.

In some embodiments, service provider computer system 130 is configured to regularly poll, request or otherwise obtain information from the POS computer 112 about tickets (e.g., ticket 306) that are created or updated at POS computer 312. Regular or periodic polling or requesting is not required, but may be performed. Alternatively, requests for ticket data may occur in response to specified operations or events.

In some embodiments, at block 216 the service provider computer system 130 sends a request for ticket data for table 22 to plug-in 114 at the merchant POS computer 112. Table 22 is included because the record for Alice Smith is marked as unpaid at system 130. At this point, the service provider computer 130 uses table 22 as the table number because it received that table number via block 208, but the table number is not considered authoritative because the dining party could have been moved to a different table and/or the ticket opened at block 212 may reflect a different table number in the merchant POS computer 112.

In some embodiments, at block 216 the service provider computer system 130 sends a request for all open or all recent tickets, regardless of table, to plug-in 114 at the merchant POS computer 112. This type of request for all open or recent tickets may be appropriate when the table number associated with the record 310 at block 201 is unavailable or is considered to be inaccurate or unreliable.

In some implementations, instead of waiting for the service provider computer system 130 to request ticket data, plug-in 114 sends ticket data to service provider computer system 130 at periodic or regular intervals or in response to certain events at merchant POS computer 112. For example, plug-in 114 may send ticket data to service provider computer system 130 in response to detecting a new ticket opened by staff at merchant POS computer 112. Thus, it is not necessary that service provider computer system 130 request ticket data as in block 216 in order to obtain ticket data from merchant POS computer 112.

At block 220 the payment plug-in 114 forms and sends a query to the database of the merchant POS computer 112 to obtain ticket data. Data obtained from the POS computer 112 for a ticket can include, but is not limited to, the time the ticket has been created, the table at which the diner has been seated, and/or the actual party size. However, since the Reservation ID for record 310 may not have been communicated to POS computer 112, either by booking computer 110 or by service provider computer system 130, the ticket data obtained from POS computer 112 may not include the Reservation ID.

The merchant POS computer 112 may reply to the query with zero or more tickets with associated data, as seen at block 222. For example, the merchant POS computer 112 may determine that there are zero, one, or more than one ticket having table 22 specified as the table number. There could be zero tickets for table 22 if the query is received before restaurant staff created a ticket for that table. There could be one ticket for table 22 if Alice Smith was the first party seated at table 22 during the business day, and/or if the merchant POS computer 112 supports both ticket opening and ticket closing functions. There could be two or more tickets for table 22 if Alice Smith was not the first party seated at table 22 during the business day and the merchant POS computer 112 does not support the concept of closing tickets. In such systems, multiple tickets with ticket numbers but the same table number could be available in the system at any one time. In some cases, message 312 may have contained an erroneous table number.

In some embodiments, the information received from the merchant booking computer 110 via block 208 and the POS computer 112 via block 222 is analyzed to find a match between a diner and a ticket so as to allow the diner to pay the ticket via the mobile payment system as further described herein.

At block 224, the service provider computer system 130 matches the ticket data received from the merchant POS computer 112 to a reservation record. Matching may be performed using any of several different approaches.

1. If the merchant POS computer 112 returns ticket data for a single ticket having a table number that matches the table number of interest at the service provider computer system 130 (for example, table 22 of Alice Smith), then the service provider computer system 130 may determine that the single ticket data matches, and the ticket number of the single matching ticket may be used for all subsequent queries to the merchant POS computer.

2. If the merchant POS computer 112 returns ticket data for two or more tickets having a table number that matches the table number of interest at the service provider computer system 130, then the service provider computer system 130 may compare a timestamp value received as part of each ticket data (e.g., a ticket creation timestamp value) to the time at which a party was actually seated at the table of interest and may select the ticket with the closest matching time. For example, if the record 310 at the service provider computer system 130 has or is associated with reservation time value of 19:17, a first ticket 306 from the merchant POS computer 112 has a ticket creation time value of 19:20, and a second ticket from the merchant POS computer 112 has a ticket creation time value of 18:02, then the service provider computer system 130 may select the first ticket 306 as matching and use its ticket number in subsequent queries. The reservation time to ticket creation time comparison approach may be used in conjunction with or instead of a ticket number comparison approach. In addition, party size information such as actual party size and reserved party size may also be used for matching ticket data to a reservation record in conjunction with the above approaches.

3. If the merchant POS computer 112 returns an error, or reports that no matching ticket is found, then in some embodiments, block 224 or other functional blocks may comprise the service provider computer system 130 generating and sending a message to the mobile computing device 102 that prompts the user to enter a number of the table at which the user was seated, as seen at arrow 225. Thus, in some embodiments, the process of FIG. 2 may be configured to support automated as well as manual ticket-matching options in restaurant mobile payment solution app.

As described for block 224, the mobile payment solution attempts automatically to map a diner with a ticket that is created on the merchant POS computer 112, using various pieces of data from the merchant booking computer 110 as well as the POS computer 112 to automatically find the check for the diner. If successful, the diner is automatically notified about the check. If unable to find the check automatically, the application falls back on asking the diner to manually enter the table number at which he or she is seated and the service provider computer system 130 then may retrieve check data from the POS computer 112 using a query that includes the table number. This approach ensures that failing the success of the heuristic-based check matching algorithm, the diner still has the option to pay for the meal via the mobile payment solution.

In some cases the data received via block 222 may contain complete order line items for food and beverage or other products or services identified in the ticket, and in some embodiments the data may consist only of ticket metadata such as ticket number, ticket creation time, table number, and/or party size. Accordingly, using zero or more other messages and queries to the merchant POS computer 112 based on the matched or entered table number or ticket number, the service provider computer system 130 may obtain order items or other ticket data for the matching ticket and the data may be stored at the service provider computer 130 in association with the reservation record 310. Alternatively, an error message may be returned and manual table entry may be performed as noted above, followed by obtaining order line item detail using the manually entered table number as a key for queries.

At block 226, if the matching operation was successful then the service provider computer 130 may return the ticket data, or just the table number, to the mobile computing device 102 and the mobile app 103 may generate an updated display to signal the diner that ticket details were obtained and can be viewed on the mobile device.

Further, in some embodiments as described in greater detail below with respect to FIG. 4A and FIG. 4B, block 226 involves automatically initiating a payment authorization operation via the payment network gateway computer 140 in an amount equal to the maximum expected check amount for the restaurant or table. The authorization operation may form part of a two-part authorization/charge transaction that is conventionally used for payment card transactions using digital communications. The authorization amount may vary from merchant to merchant, and could be based upon the nature of the merchant, the size of the table, or other factors. For example, if the merchant is a "fast casual" restaurant and the table is a two-top, then the authorization amount might be $100, whereas if the merchant is a fine-dining restaurant and the table is a four-top, then the authorization amount might be $500.

In some embodiments, block 228 comprises the service provider computer 130 instructing the merchant POS computer 112 to mark the ticket as designated for mobile payment.

In some embodiments, service provider computer system 130 may instruct the payment plug-in 114 at merchant POS computer 112 to mark the ticket in the merchant POS system as potentially designated for mobile payment. In some embodiments, marking a ticket may comprise the payment plug-in 114 issuing a command to rename the ticket in the merchant POS computer 112 with a distinctive name that indicates that mobile payment may potentially be used. In some embodiments, marking a ticket for mobile payment may include the payment plug-in 114 issuing a command to add a no cost (e.g., $0) order line item to the ticket that indicates that mobile payment may potentially be used. The no cost order line item may have a distinctive name or be associated with a menu item code that indicates that mobile payment will be used for the ticket.

In some embodiments, service provider computer system 130 may instruct the payment plug-in 114 at merchant POS computer 112 to mark the ticket in the merchant POS system as designated for mobile payment. In some embodiments, marking a ticket may comprise the payment plug-in 114 issuing a command to rename the ticket in the merchant POS computer 112 with a distinctive name that indicates that mobile payment will be used. In some embodiments, marking a ticket for mobile payment may include the payment plug-in 114 issuing a command to add a no cost (e.g., $0) order line item to the ticket that indicates that mobile payment will be used. The no cost order line item may have a distinctive name or be associated with a menu item code that indicates that mobile payment will be used for the ticket.

In some embodiments, block 228 or other operations also may comprise providing user interface feedback within merchant POS terminals that are coupled to the merchant POS computer 112 to indicate that the check will be paid using the mobile payment solution.

In some embodiments, the solution herein is configured to obviate the need for a diner to require a waiter's attention or time in order to settle the check. In a typical case, as soon as the diner is done with the meal, the diner can settle the check at the restaurant with a click of a button in the mobile app 103, as further described herein, and leave the premises. As a consequence, service staff in restaurants may see that a diner eats and leaves without the waiter having been summoned at all to produce the check. For the waiter to know that a particular diner will pay using the mobile app 103, the diner's table's check on the merchant POS computer 112 may be modified once the diner has committed to paying the check with the mobile app 103.

In various embodiments, modification of the check in the merchant POS computer 112 may comprise renaming the check using a distinctive name, highlighting the check in a GUI display of the merchant POS computer 112 or a terminal using a distinctive color, highlighting treatment, or other indication, or displaying a distinctive logo or trademark on the check's icon.

In some embodiments, the service staff also may use one or more specialized buttons configured in the GUI of the POS terminal which when selected cause listing checks that are currently checked into by diners using the mobile app 103 for payment as well as checks that were recently paid using the mobile app and/or perform other functions. In some embodiments, a console to enable restaurants to view and initiate the payment process for a check may be provided.

In some embodiments, the payment plug-in 114 is configured to cause merchant POS computer 112 to generate and display a graphical button on the console for a check which when selected initiates the payment process to claim payment for the check. Using this function, service staff at the restaurant can cause the merchant POS computer 112 to communicate via the plug-in 114 with the service provider computer system 130 and mobile app 103 to close out the transaction with the diner's pre-selected credit card and pre-selected tip-amount. In some embodiments, the foregoing function may involve the service provider computer system 130 sending an encrypted or otherwise secured copy of payment card details to the merchant POS computer 112 via the plug-in 114 to permit the restaurant to charge the card for the ticket total amount using the restaurant's own payment networks. In other embodiments, the foregoing function may involve the service provider computer system 130 initiating a payment transaction via payment gateway computer 140 as described in connection with FIG. 4.

In some embodiments, the payment plug-in 114 is configured to cause merchant POS computer 112 to generate and display a graphical button which when selected causes listing for the server all the tables and checks that are then currently marked in the merchant POS computer 112 as designated for mobile payment. For example, this function may involve the payment plug-in 114 generating a query to obtain ticket data for all open tickets that are marked for mobile payment in the merchant POS computer 112, then instructing the merchant POS computer 112 to display the list in a pop-up window or other GUI widget.

In some embodiments, the payment plug-in 114 is configured to cause merchant POS computer 112 to generate and display a graphical button which when selected causes listing details of checks that have recently been closed using mobile payment as described herein. For example, this function may involve the payment plug-in 114 generating a query to obtain ticket data for all tickets that are marked for mobile payment in the merchant POS computer 112 and that have a zero balance or are otherwise marked as paid or closed, then instructing the merchant POS computer to display the list in a pop-up window or other GUI widget.

In some embodiments, after block 228, the process is configured to periodically automatically update the ticket data at the mobile computing device 102 in real time as long as the user has not initiated a payment transaction for the ticket. In effect, the process establishes a logical link between a diner's check as maintained in the merchant POS computer 112 and as maintained in the service provider computer system 130 and shown and/or managed via the mobile app 103.

In some embodiments, the payment plug-in 114 comprises an updating module that continuously periodically polls the merchant POS computer 112 to retrieve any updates to checks that are known to be associated with the mobile payment solution. Periodic queries from the payment plug-in 114 to the merchant POS computer 112, based upon table numbers or ticket numbers that have been marked for mobile payment, may be used.

In some embodiments, database 136 continually reflects associations of account-holders of the service provider associated with service provider computer 130, restaurant identifiers, table numbers and check numbers for which account-holders have indicated that mobile payment will be used. On any modification to a check that has been marked for mobile payment, the updating module of the payment plug-in 114 publishes the updated check to the publish-subscribe channel, for which a key value has been pre-established with the mobile app 103. The mobile app 103 periodically polls the channel to obtain updates that match the key maintained in the mobile app for the current user. In response, the user interface of the mobile app 103 is updated to show new line items for food, beverage, or other products or services of the merchant that were added to the check.

Therefore, unlike prior approaches in which the diner only receives the complete check at the end of a meal, the diner is kept informed on a mobile computing device, in real time, of any modifications made to the check and the diner can view the current contents of the diner's guest check at any time using the mobile app 103. As a result, the diner can detect errors in the check as they occur, or learn that a particular order item was not entered and therefore has not been communicated to the kitchen, or monitor the ongoing increasing total amount of the check for budgeting purposes.

Figure 4A:
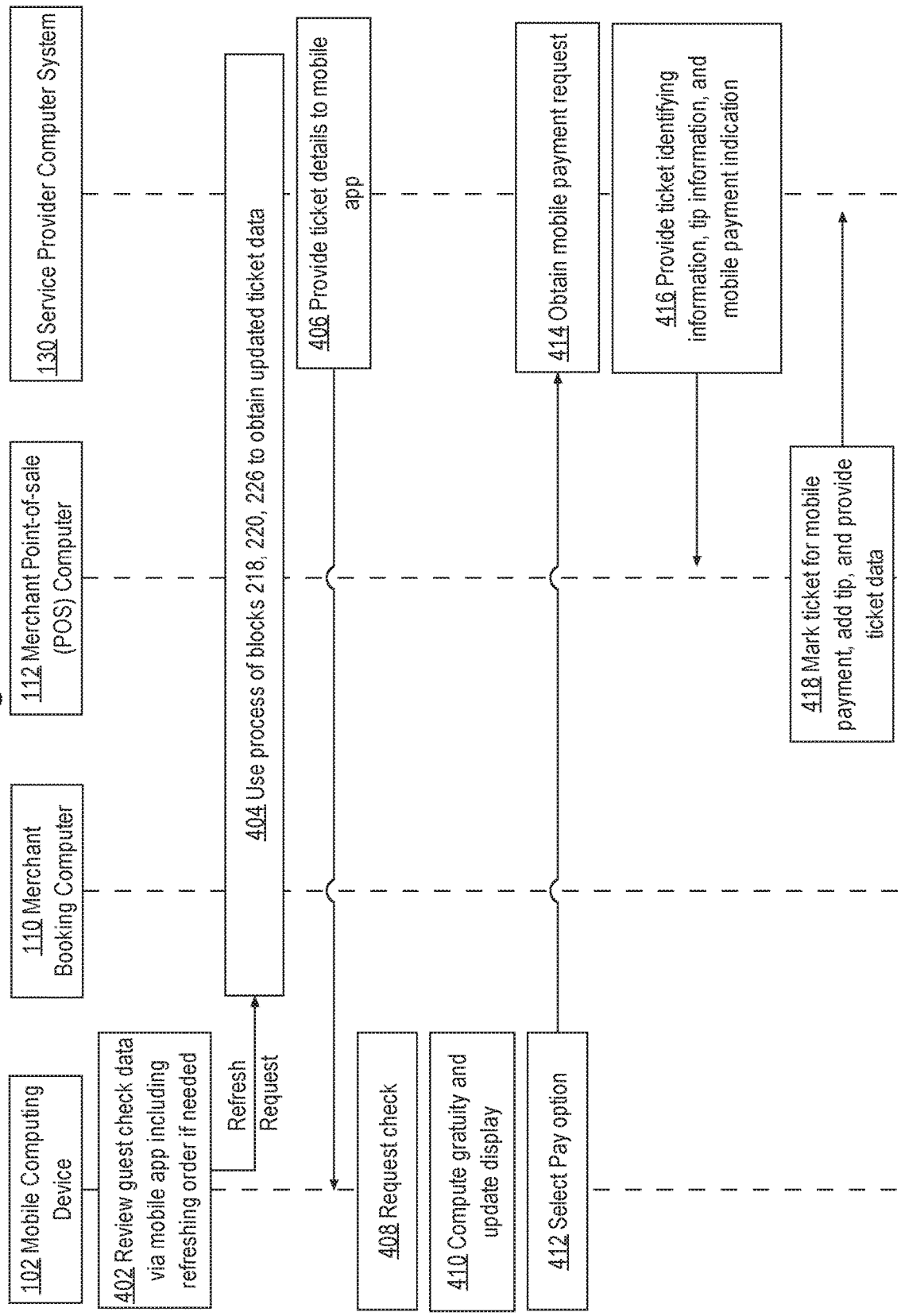
FIG. 4B is a message flow diagram that illustrates an example process for enabling a diner to transfer funds from the diner to a merchant such as a restaurant, according to some embodiments of the invention.
Figure 4B:
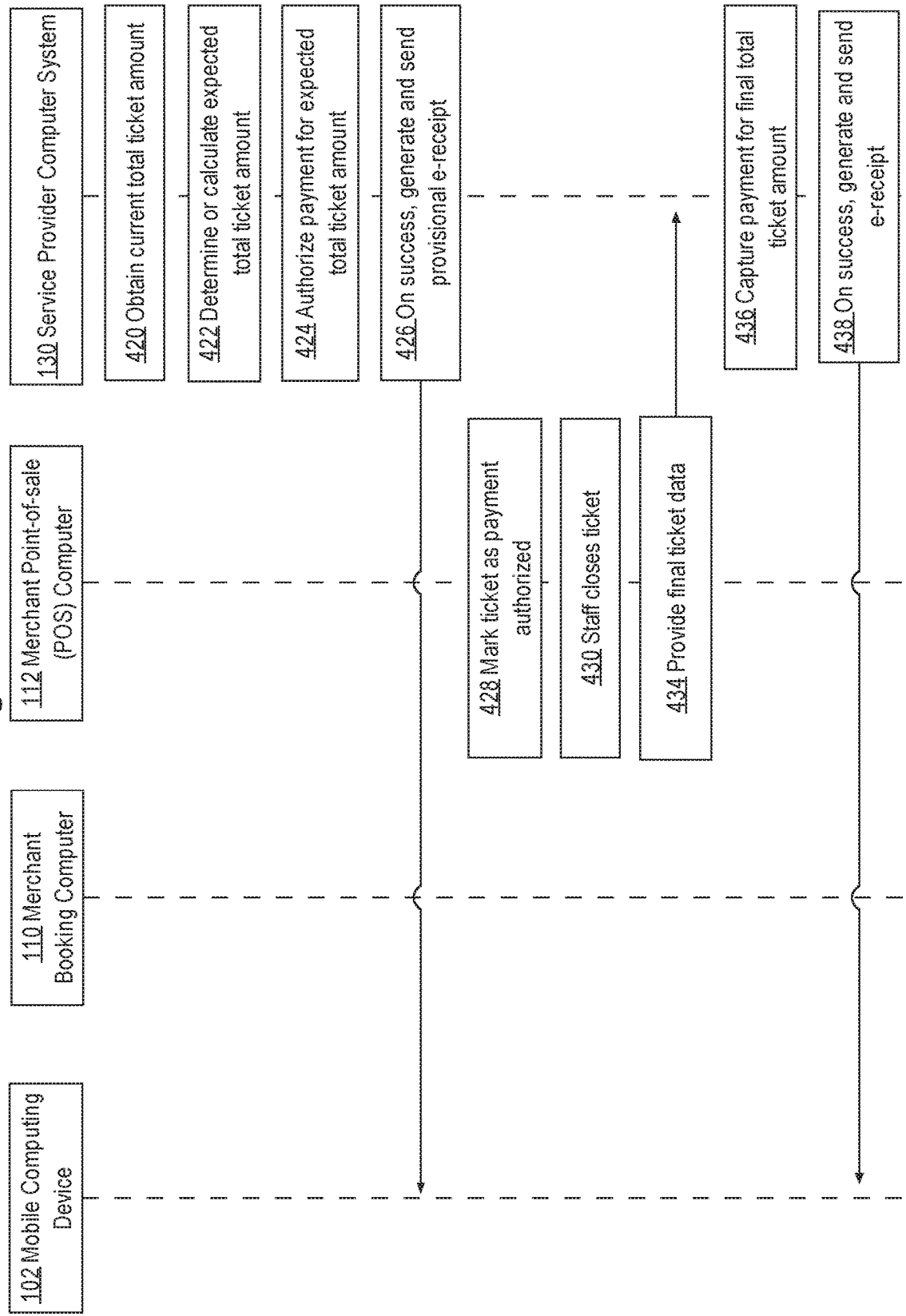

2.3 Restaurant Payment Processing Using a Third Party Marketplace Payment Gateway FIG. 4A and FIG. 4B together is a message flow diagram that illustrates an example process for enabling a diner to transfer funds from the diner to a merchant such as a restaurant. The example process includes authorizing but not capturing an expected final ticket amount with the payment network gateway computer 140 when the diner requests to pay the ticket by mobile payment using the app 103. Thereafter, when staff closes out the ticket at the merchant POS computer 112, the service provider computer system 130 is notified of the actual final check amount and in response, initiates capture of the actual final ticket amount, at or under the pre-authorized expected final ticket amount, with the payment network gateway computer 140. By doing so, if additional items are added to the ticket at the merchant POS computer 112 after the diner has invoked the payment option at the mobile computing device 102, payment for the actual final ticket amount can be captured by the merchant without having to re-authorize payment with payment network gateway computer 140. In addition, the diner is able to the leave the merchant's premises at his or her convenience while perhaps the ticket is still open at the merchant POS computer 112 and without having to wait for staff to close or finalize the ticket at the merchant POS computer 112 before leaving. This approach also allows the merchant to add ticket items to the ticket at the merchant POS computer 112 after the diner has invoked the payment option at the mobile computing device 102 and still capture payment from the diner for the added items. For example, the merchant can still capture payment for items ordered by the diner but not yet entered by staff at the merchant POS computer 112 by the time the diner invokes the payment option at the mobile computing device 102.

In some embodiments, the mobile payment solution is configured to enable a diner to transfer funds from the diner to the restaurant. In some embodiments, the funds are transferred from a diner's credit or debit card to the restaurant's bank account. For example, in one arrangement the system uses a third party marketplace payment gateway, such as the Stripe Connect system, to charge a diner's credit or debit card on behalf of the restaurant, thereby directly transferring the funds from the payment card into the restaurant's bank account. The money that is transferred into the restaurant's bank account does not travel to or through an account associated with the service provider computer 130. Instead, the service provider computer 130 communicates with other elements of the system to determine when a diner's guest check should be paid, to determine the amount, to receive authorization for payment, and to instruct the third party payment gateway to initiate a payment transaction for the benefit of the restaurant.

At block 402, the mobile computing device 102 reviews guest check data via the mobile app 103, including refreshing order details if needed. Block 402 broadly represents obtaining and displaying ticket data such as order line items on the display screen of the mobile computing device, receiving a user selection of a refresh function, and initiating a refresh request if needed. A refresh request is appropriate, for example, if the party has ordered other menu items, beverages, or other products or services of the merchant after receiving an earlier display of the ticket details.

If a refresh request is made, as shown in block 404, the process previously described for FIG. 2 may be used to interact with the merchant POS computer 112 and/or service provider computer 130 to locate a matching ticket, obtain updated ticket details from the POS computer and update the service provider computer system with the ticket details. In general, block 404 represents interacting with the merchant POS computer 112 to obtain the then-current contents of a ticket for the table at which the mobile computing device 102 is located.

At block 406, the updated ticket details are returned from the service provider computer system 130 over the network to the mobile computing device 102.

At block 408, a check request function is invoked. For example, a user of the mobile computing device 102 selects a Request Check function in the display of the mobile app 103.

In response, at block 410, the mobile app 103 may locally compute a gratuity and total for the ticket and may update the display to show the ticket total, tax, gratuity, and other details.

At block 412, a payment option is invoked. For example, a user of the mobile computing device 102 selects a Pay function in the display of the mobile app 103. In response, the mobile computing device 102 forms and sends a request to pay the ticket or check to the service provider computer 130 and provides the total payment amount based upon locally computing the ticket total, tax, gratuity, etc.

In some embodiments, a check request separate from a request to pay is not invoked as described above with respect to block 408 and computation of the total, tax, and gratuity and update of the display as described above with respect to block 410 may be performed in response to invoking the payment option. Thus, in these embodiments, the diner may pay the check without having to first request the check.

At block 414 the service provider computer system 130 receives the request to pay from the mobile computing device 102. The request may specify reservation and ticket identifying information such as the Reservation ID, an identifier of the diner (Diner ID), an identifier of the merchant (Merchant ID), an identifier of the ticket (Ticket ID), and/or a ticket creation time (Ticket Creation Time). Some of all of this reservation and ticket identifying information may be obtained by the mobile computing device 102 from the service provider computer system 130, for example, as part of reservation creation (e.g., blocks 202 and 204 of FIG. 2) and ticket matching (e.g., blocks 224, 225, and 226 of FIG. 2). The Diner ID may correspond to a user identifier used by the diner to authenticate with the service provider computer system 130, for example when creating the reservation and when requesting to pay, and may be associated with the application 103 at the mobile computing device 102. In some embodiments, the request to pay from the mobile computing device 102 includes the Reservation ID and the service provider computer system 130 determines the Diner ID, Merchant ID, and/or the Ticket ID from the record 310 identified by the Reservation ID.

The request to pay from the mobile computing device 102 may also specify a tip or gratuity amount and/or a percentage tip or gratuity amount selected by the diner using the application 103 in conjunction with invoking the mobile payment option of the application. For example, after the diner selects the mobile payment option through a user interface presented by the application 103 to the diner, the application 103 may prompt the diner to select a percentage tip or gratuity amount.

Next, the service provider computer system 130 obtains the current total check amount from the merchant POS computer 112. To do so, in some embodiments, the service provider computer system 130 at block 416 requests ticket data for the ticket to be paid by mobile payment from the merchant POS computer 112 by providing to the POS plug-in 114 ticket identifying information such as the Merchant ID, the Ticket ID, and/or the Ticket Creation Time. In other embodiments, the service provider computer system 130 requests ticket data for all currently open tickets or ticket data for all recently opened tickets, where a recently opened ticket is one with a ticket creation time not more than some specified amount of time in the past relative to a current time (e.g., all tickets opened in the past twenty-four hours). In embodiments where ticket data is obtained by service provider computer system 130 for multiple tickets, the service provider computer system 103 can identify the ticket of interest to be paid by mobile payment by matching one of the multiple tickets to a reservation record as described above with respect to block 224 of FIG. 2.

Also at block 416, the service provider computer system 130 may also provide an indication to the POS plug-in 114 that the ticket is now designated for mobile payment as requested by the pay request received from the mobile computing device 102 by the service provider computer system 130 at block 414.

Also at block 416, the service provider computer system 130 may also provide to the plug-in 114 the diner's selected tip or gratuity amount or percentage as received in the pay request at block 414.

At block 418 the ticket is marked in the merchant POS system 112 as designated for mobile payment. In some embodiments, marking a ticket may comprise the payment plug-in 114 issuing a command to rename the ticket in the merchant POS computer 112 with a distinctive name that indicates that mobile payment will be used. In some embodiments, marking a ticket for mobile payment may include the payment plug-in 114 issuing a command to add a no cost (e.g., $0) order line item to the ticket that indicates that mobile payment will be used. The no cost order line item may have a distinctive name or be associated with a particular menu item code that indicates that mobile payment will be used for the ticket. By marking the ticket in this way, a staff person viewing the ticket at the merchant POS computer 112 can tell from the displayed name of the ticket and/or the displayed no cost order line item that the diner wishes to pay the ticket with the mobile payment option, as opposed to a traditional payment method such as by the staff person manually swiping the diner's credit card or other payment card.

Also at block 418, a tip or gratuity line item may be added to the ticket at the merchant POS computer 112. The added tip or gratuity line item may be based on a tip or gratuity amount or percentage received from the service provider computer system 130 at block 616. By viewing the displayed tip or gratuity line item at the merchant POS computer 112, staff can see the tip or gratuity amount or percentage that was selected by the diner using the application 103 at block 412.

Also at block 418, the plug-in 114 obtains the requested ticket data from the merchant POS system 112 and provides it to the service provider computer system 130. The ticket data provided to the service provider computer system 130 may include a current total ticket amount or data from which the current total ticket amount can be calculated by the service provider computer system 130. In either case, the service provider computer system 130 obtains the current total ticket amount for the ticket to be paid by mobile payment at block 420. The current total ticket amount may include the total cost of all currently ordered items, tax, tip, and any other current changes.

If the ticket is closed at the merchant POS computer 112 as indicated by the ticket data provided to the service provider computer system 130 at block 418, then the current total ticket amount may be the final total ticket amount, In which case, payment (authorization and capture) of the current total ticket amount with payment network gateway computer 140.

If, on the other hand, the ticket data provided to the service provider computer system 130 at block 418 indicates that the ticket is currently open at the merchant POS computer 112 or does not include an indication on whether the ticket is currently open or closed, then the service provider computer system 130 can treat the ticket as being currently open. In this case, the service provider computer system 130 determines or calculates at block 422 an expected total ticket amount that is at least as much as the current total ticket amount.

In some embodiments, an expected total ticket amount is calculated as a multiple (e.g., 1.5 or 1.75) of the current total ticket amount. Payment for expected total ticket amount is then authorized but not yet captured with the payment network gateway computer 140 at block 424. The service provider computer system 130 attempts to capture the actual total ticket amount when it receives it from the merchant POS computer 112 after the ticket is closed at the merchant POS computer 112 by staff.

Ideally, the multiple used in the calculation of the expected total ticket amount should result in an excepted total ticket amount that ends up being equal the actual total ticket amount when the ticket is eventually closed. However, at the time the multiple is used to calculate the expected total ticket amount at block 422, the actual total ticket amount may be unknown. In practice, the multiple used in the calculation balances between the risk of authorizing payment for an amount that that ends up being lower than the actual total ticket amount and the risk of authoring payment for an amount that far exceeds the actual total ticket amount. If payment is authorized for an amount that ends up being less than the actual total ticket amount, then an additional payment authorization will be needed to capture the difference, which is inefficient and may astonish the diner who may expect only one payment authorization on his or his bank receipt or statement. If payment is authorized for an amount that ends up being far more than the actual total ticket amount, this may also astonish the diner, especially if the diner learns of the authorized amount before the actual total ticket amount is captured.

Accordingly, the multiple used in the calculation may be fixed or may vary from ticket to ticket depending on a variety of different factors including, but not limited to, the restaurant, the type of restaurant (e.g., fast food vs fine dining), the current total ticket amount, the size of the party, past actual total ticket amounts for past tickets for the diner, past actual total ticket amounts for past tickets for the diner at the restaurant, past actual total ticket amounts for past tickets for other diners at the restaurant, past amount differences between actual total ticket amounts and expected total ticket amounts for past tickets for the diner, past amount differences between actual total ticket amounts and expected total ticket amounts for past tickets for the diner at the restaurant, past amount differences between actual total ticket amounts and expected total ticket amounts for past tickets for other diners at the restaurant, and other factors. Combinations of factors may also be used. For example, the multiple used to calculate the expected total ticket amount may be determined based on an average of weighted numerical values representing various factors.

At block 424, the service provider computer 130 sends a request to authorize but not yet capture payment of the expected total ticket amount to the payment network gateway computer 140 (FIG. 1).

Although the specific format of the request of block 424 may vary in various embodiments based upon protocols or requirements implemented at the payment network gateway computer 140, in general the request specifies the expected total ticket amount to authorize payment of, payer payment information (e.g., the diner's payment card number or bank account number), and payee payment information (e.g., the merchant's bank account and routing number).

In some embodiments, the payer and payee payment information is stored in database 136, but other storage may be used in different embodiments. For example, the mobile computing device 102 could store the payer payment information at the mobile computing device and could provide the payer payment information, typically in an encrypted or otherwise secure format, as part of the message linking blocks 412, 614.

In some embodiments, the user of the mobile computing device 102 may establish an account with the payment network gateway computer 140 based upon a user name, password or other secure credentials and store the payer payment information in records in the payment network gateway computer. In this variation, the mobile app 103 would be configured with a reference to the payment network gateway computer 140 and the user credentials, and the message linking blocks 412, 614 could specify the user credentials.

In some embodiments, at block 424, a success or failure message for the authorization of the expected total ticket amount is received from the payment network gateway computer 140 at the service provider computer system 130. Operations performed in response to a failure of the payment authorization transaction are not critical and may vary in various embodiments.

If the payment authorization transaction was successful, then at block 426, a provisional electronic receipt is generated and communicated to the mobile computing device 102 for display by the mobile application 103 to the diner. At this point, the diner is free to leave the merchant premises as payment for the expected total ticket amount has been successfully authorized.

If the payment authorization transaction is not successful, for example because the payment network gateway computer 140 did not authorize the expected total ticket amount for a given payment card number, then the payment authorization transaction may be repeated with an alternative or backup payer payment information (e.g., another credit card on file). In some embodiments, a message is sent to the mobile computing device 102 notifying that payment authorization was unsuccessful and prompting the diner to select an alternative or backup payment method using the mobile application 103. Upon the diner's selection of an alternative or backup payment method, the payment method may then start again from block 412 but this time using the selected alternative or backup payer payment information.

Also at block 426, the service provider computer system 130 may also notify the plug-in 114 of the merchant POS computer 112 that payment of the ticket has been authorized by the diner. In response, at block 428 the ticket is marked in the merchant POS system 112 as payment authorized. In some embodiments, marking a ticket may comprise the payment plug-in 114 issuing a command to rename the ticket in the merchant POS computer 112 with a distinctive name that indicates that payment of the ticket by the diner has been authorized. In some embodiments, marking a ticket as payment authorized may include the payment plug-in 114 issuing a command to add a no cost (e.g., $0) order line item to the ticket that indicates that payment of the ticket by the diner has been authorized. The no cost order line item may have a distinctive name or be associated with a particular menu item code that indicates payment of the ticket by the diner has been authorized. By marking the ticket in this way, a staff person viewing the ticket at the merchant POS computer 112 can tell from the displayed name of the ticket and/or the displayed no cost order line item that the diner has already requested mobile payment and that payment of the ticket by the diner has been authorized with the payment network gateway computer 140.

At block 430, merchant staff closes the ticket at the merchant POS computer 112. Before doing so, the staff may add one or more ordered items to the ticket using conventional user interface elements of the merchant POS computer 112. To close the ticket, the staff may be presented in a graphical user interface presented on a display of the merchant POS computer 112 with a "close with mobile payment" button or other similarly labeled button or user interface element which, when activated with user input, causes the service provider computer system 130 to be notified that the ticket is now closed and to be notified of the final total ticket amount. In some embodiments, the "close with mobile payment" button or user interface element is displayed for the ticket only if the ticket has been previously marked as designated for potential mobile payment, marked as designated for mobile payment, or marked as mobile payment authorized, as described above.

At block 434, in response to staff closing the ticket at the merchant POS computer 112, the plug-in 114 provides the final ticket data for the now closed ticket to the service provider computer system 130. The final ticket data may include the final total ticket amount or data from which the final total ticket amount can be calculated.

In some embodiments, when staff selects the "close with mobile payment" button or user interface element, a ticket line item with a particular name or associated with a particular line item code is added to the ticket at the merchant POS computer 112 to indicate to the plug-in 114 that the ticket has been closed. The plug-in 114 can then obtain closed tickets from the merchant POS computer 112 by querying the merchant POS computer 112 for tickets having the ticket line item with the particular name and/or the particular line item code.

In some embodiments, when staff selects the "close with mobile payment" button or user interface element, the merchant POS computer 112 notifies the plug-in 114 of the closed ticket, which then obtains the ticket data from the merchant POS computer 112 and provides it to the service provider computer system 103.

In some embodiments, when staff selects the "close with mobile payment" button or user interface element, the merchant POS computer 112 provides the final ticket data or ticket identifying information to the service provider computer system 130 bypassing the plug-in 114. For example, the merchant POS computer 112 may establish a Transmission Control Protocol (TCP) network connection to the service provider computer system 130 and provide the final ticket data or ticket identifying information to the service provider computer system 130 over the TCP network connection.

In any case, if the service provider computer system 130 is provided only with ticket identifying information at block 434, the service provider computer system 130 can request the final ticket data from plug-in 114 by providing the ticket identifying information to the plug-in 114 in a request to the plug-in 114 for the final ticket data.

At block 436, assuming the final total ticket amount is less than or request to the authorized expected total ticket amount, the service provider computer 130 sends a request to capture from the diner for the merchant the final total ticket amount to the payment network gateway computer 140 (FIG. 1). Such request may include providing information returned from the payment network gateway computer 140 in response to the authorization request at block 424. For example, capturing the final total ticket amount may include sending a payment authorization identifier returned from the payment network gateway computer 140 in response to the authorization request at block 424.

Although the specific format of the request of block 436 may vary in various embodiments based upon protocols or requirements implemented at the payment network gateway computer 140, in general the capture request specifies the final total payment amount and a payment authorization identifier returned from the payment network gateway computer 140 in response to the payment authorization request at block 624. The request may also specify other payment information such as payer payment information and payee payment information.

In some embodiments, at block 438, a success or failure message is received from the payment network gateway computer 140 at the service provider computer system 130. Operations performed in response to a failure of the payment transaction are not critical and may vary in various embodiments. If the payment transaction was successful, then at block 438, an electronic receipt is generated and communicated both to the merchant POS computer 112 and to the mobile computing device 102. For example, the e-receipt may be sent to the payment plug-in 114 and then communicated from the plug-in to the merchant POS computer 112 using an appropriate request or message. Concurrently the e-receipt is sent over the network to the mobile application 103 at the mobile computing device 102.

Using this approach, once the diner has paid for the check, the diner receives an email with a receipt similar in format to the printed receipt that would have been received at the restaurant if any other payment tender medium had been used. In some embodiments, mobile app 103 may be configured to enable a diner to view a log of all payment transactions made via the app and to select and generate email messages to which receipts for past transactions are attached. Further, the restaurant manager may receive the same receipt data via plug-in 114 and merchant POS computer 112. As a result, the diner and the restaurant have the identical receipt which can be used in case of contesting or disputing erroneous charges; the diner can print and file the receipt like a regular paper receipt from a restaurant; the diner could send the soft copy, or print out and submit soft copies that the diner might need for filing expenses or claiming reimbursements; and the merchant receives a document that may be used in auditing operations, to confirm calculations and distributions of tips to staff, or for other accounting purposes. Thus, embodiments may be configured for maintaining mobile payment transaction history with the ability to generate and email records and receipts for past transactions.

Using this approach, in some embodiments, a restaurant mobile payment solution may be integrated with an application program that is configured to provide reservation-making and viewing functions in the same app. For example, in some embodiments, the mobile app 103 is configured to provide reservation-making functions of the type commercially available at the time of this writing in the OpenTable smart phone application from OpenTable, Inc., San Francisco, Calif. Unlike prior approaches, In some embodiments, a mobile payment solution is integrated into the application to provide users with a novel solution that both allows them to make reservations at a restaurant as well as pay for that reservation. This obviates the need for users to have to download separate applications for the purposes of making a reservation and for paying for that reservation.

It should be noted that while the above mobile payment process is described by example in the context of restaurant dining, the process can be applied more generally to any customer and merchant scenario in which the merchant opens and maintains a tab or ticket for a customer in a merchant POS computer and in which the customer may wish to pay and leave the merchant's premises without having to first wait for merchant staff to close the tab or ticket in the merchant POS computer.

2.4 Under Authorization

It is possible that estimated total ticket amount for which payment is pre-authorized at block 424 turns out to be too small once the final total ticket amount is known at block 434. This situation can be referred to as an "under authorization".

In a "drop and re-authorize" implementation, when an under authorization occurs, at block 438, a request to the payment network gateway computer 140 is made to release the previous payment authorization for the estimated total ticket amount and a new payment request (authorization and capture) for the final total ticket amount is made with the payment network gateway computer 140.

In an "incremental authorization" implementation, when an under authorization occurs, at block 438, a request to capture the previously authorized estimated total ticket amount is made with the payment network gateway computer 140 and another request to authorize and capture the difference between the final total ticket amount and the estimated total ticket amount is made with the payment network gateway computer 140.

In a "parallel authorization and drop on success" implementation, when an under authorization occurs, at block 438, a request to the payment network gateway computer 140 is made to authorize but not capture the final total ticket amount without first releasing the prior authorization for the estimated total ticket amount. If the parallel authorization request is successful, then the prior authorization for estimated total ticket amount is released and a request to capture the final total ticket amount is made with the payment network gateway computer 140.

In some embodiments, if the final total ticket amount exceeds the estimated total ticket amount and payment for the final total ticket amount cannot be captured using the "drop and re-authorize" technique, the "incremental authorization" technique, or the "parallel authorization and drop on success" technique, then payment of at least the estimated total ticket amount is captured for the merchant. The service provider computer system 130 may then notify (e.g., by e-mail) both the merchant and the diner of the remaining balance which can be resolved between the diner and the merchant through an offline or online dispute resolution process.

In some embodiments, when a tax or gratuity is automatically calculated by the mobile application 103 or the system provider computer system 130, it is calculated based on a current ticket sub-total (pre-tax and other charges). In other embodiments, it is calculated based on a current ticket total (after-tax and other charges).

In some embodiments, ticket data obtained from the merchant POS computer 112 for a ticket indicates whether a tip or gratuity as already been added by the merchant, for example, because the party size exceeds a threshold number. In this case, the mobile application 103 can alert the diner when the user selects the mobile payment option that a tip or gratuity has already been added.

2.5 Example Screen Displays

Figure 5A:
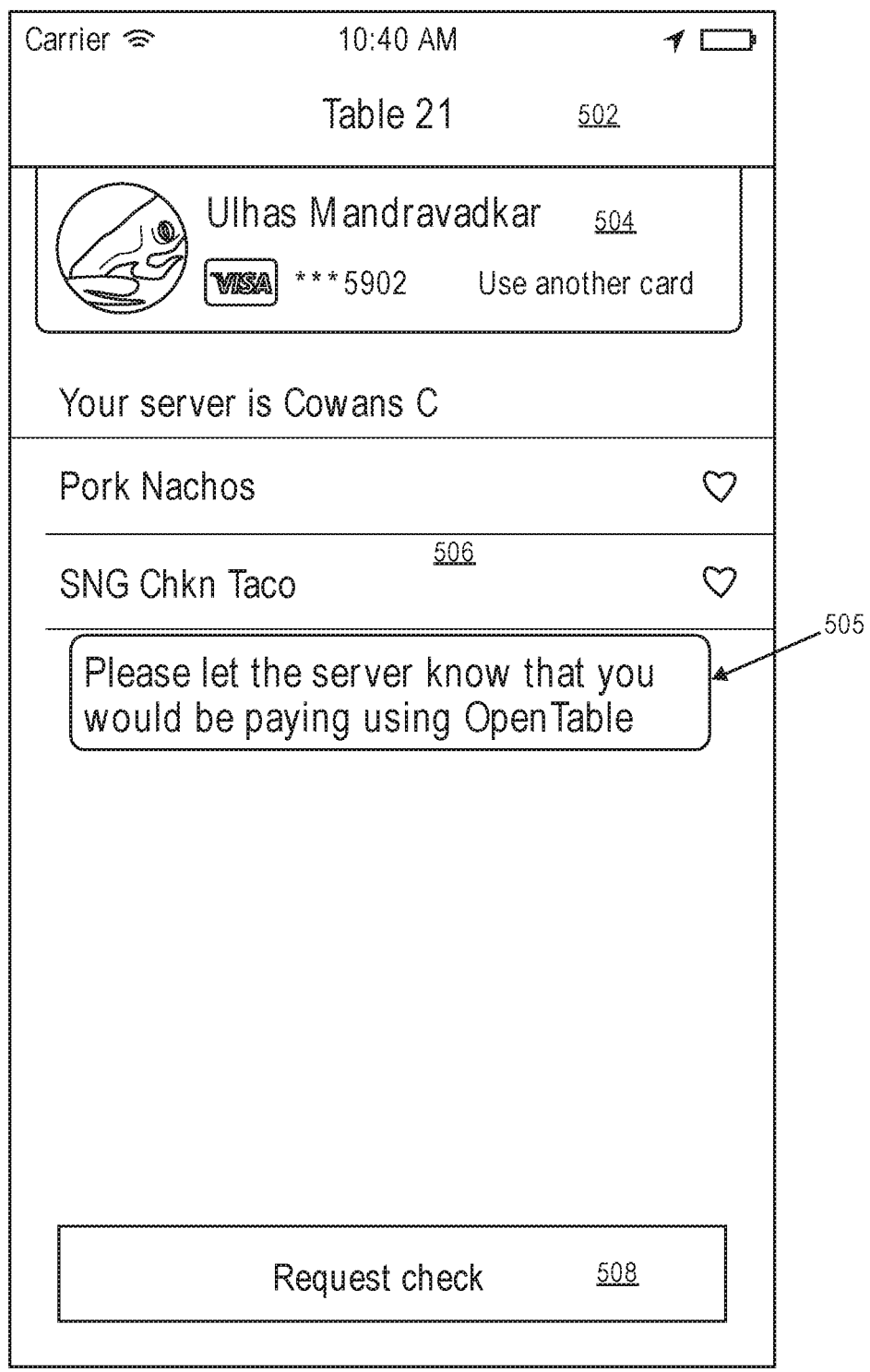
FIG. 5A, FIG. 5B, FIG. 5C, FIG. 5D, FIG. 5E, FIG. 5F, FIG. 5G, FIG. 5H, FIG. 5J, FIG. 5K illustrate example screen displays that a mobile app may generate and display using a mobile computing device such as a smartphone in connection with payment functions.

FIG. 5A illustrates a first example screen display that the mobile app may generate on a mobile computing device. A screen display 502 comprises an account pane 504, an order region 506 and a check request button 508. In some embodiments, screen display 502 may be displayed in response to the success indication of block 226 (FIG. 2); thus, the screen display of FIG. 5A may indicate to the user of the mobile computing device 102 that the matching operation of block 224 was successful and that ticket data for the table was obtained.

In some embodiments, the account pane 504 displays a name and image associated with an account that is then currently logged in using the mobile app 103 to the booking application 132 of the service provider computer system 130. In some embodiments, the account pane 504 also may display a part or all of account information for a payment card that is then currently configured in the mobile app 103 for purposes of processing payments of the account owner at restaurants with which the mobile app is used.

In some embodiments, the order region 506 displays one or more line items that identify food, beverage or other items that the account owner or other members of the party have ordered at the restaurant. Line items shown as examples in FIG. 5A are "Pork Nachos" and "Single Chicken Taco". The line items reflect data that was obtained from the merchant POS computer 110 and associated with a ticket for the table number that is indicated in the screen display 502. The order region 506 also may display a name of the server assigned to the table, "Cowans C" in this example, which also may be obtained from the merchant POS computer 110 in some embodiments.

Optionally, in some embodiments, screen display 502 may comprise a prompt message 505 that suggests to the account owner or other user of the mobile computing device 102 that the server of the table may be informed that the party will use the mobile app 103 and other elements of the system herein for purposes of payment. In some embodiments, mobile app 103 is configured to display the prompt message 505 in response to initial launching or opening of the mobile app on the mobile computing device.

In some embodiments, selecting the check request button 508 causes the mobile app 103 to form and send a message to the service provider computer system 130. Operations that occur in response are described further in other sections herein.

Figure 5B:
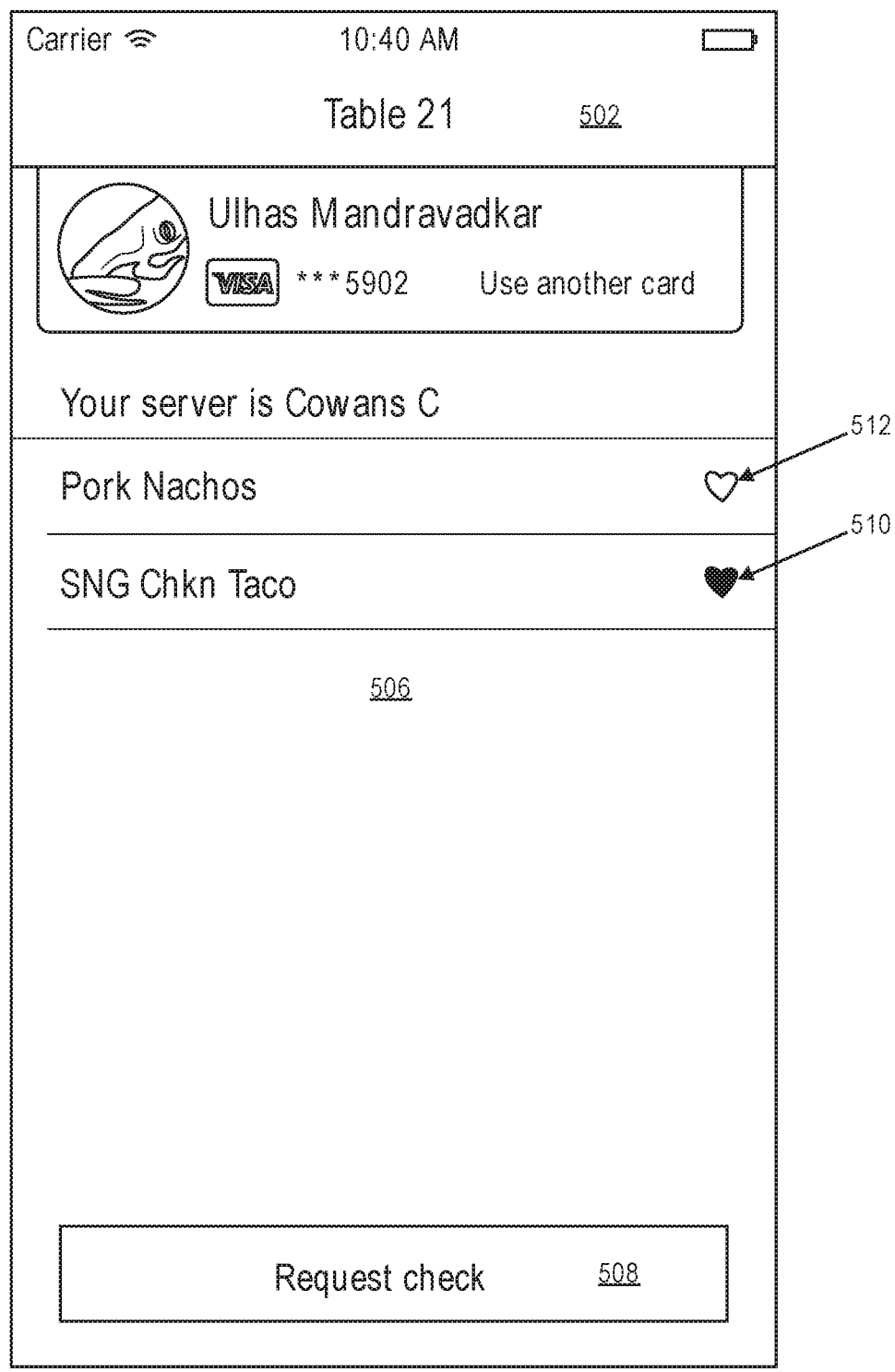

FIG. 5B illustrates a second example screen display that the mobile app may generate on a mobile computing device. As seen in FIG. 5B, in some embodiments the prompt message 505 of FIG. 5A may be omitted at times other than initially opening the mobile app 103. Further, the order region 506 may comprise first and second line items each of which may have respective approval icons 512, 510 comprising user-selectable widgets.

In some embodiments, selecting a particular approval icon 510 signals the mobile app 103 that the user of the mobile app likes or approves of the particular line item, and the mobile app may be configured to form and send a message to the service provider computer system 130 indicating the selection. Thereafter, as further described herein, the service provider computer system 130 can generate one or more reports that provide analytical data about the favorite menu items of a large number of diners, items that were ordered together, and so forth.

Figure 5C:
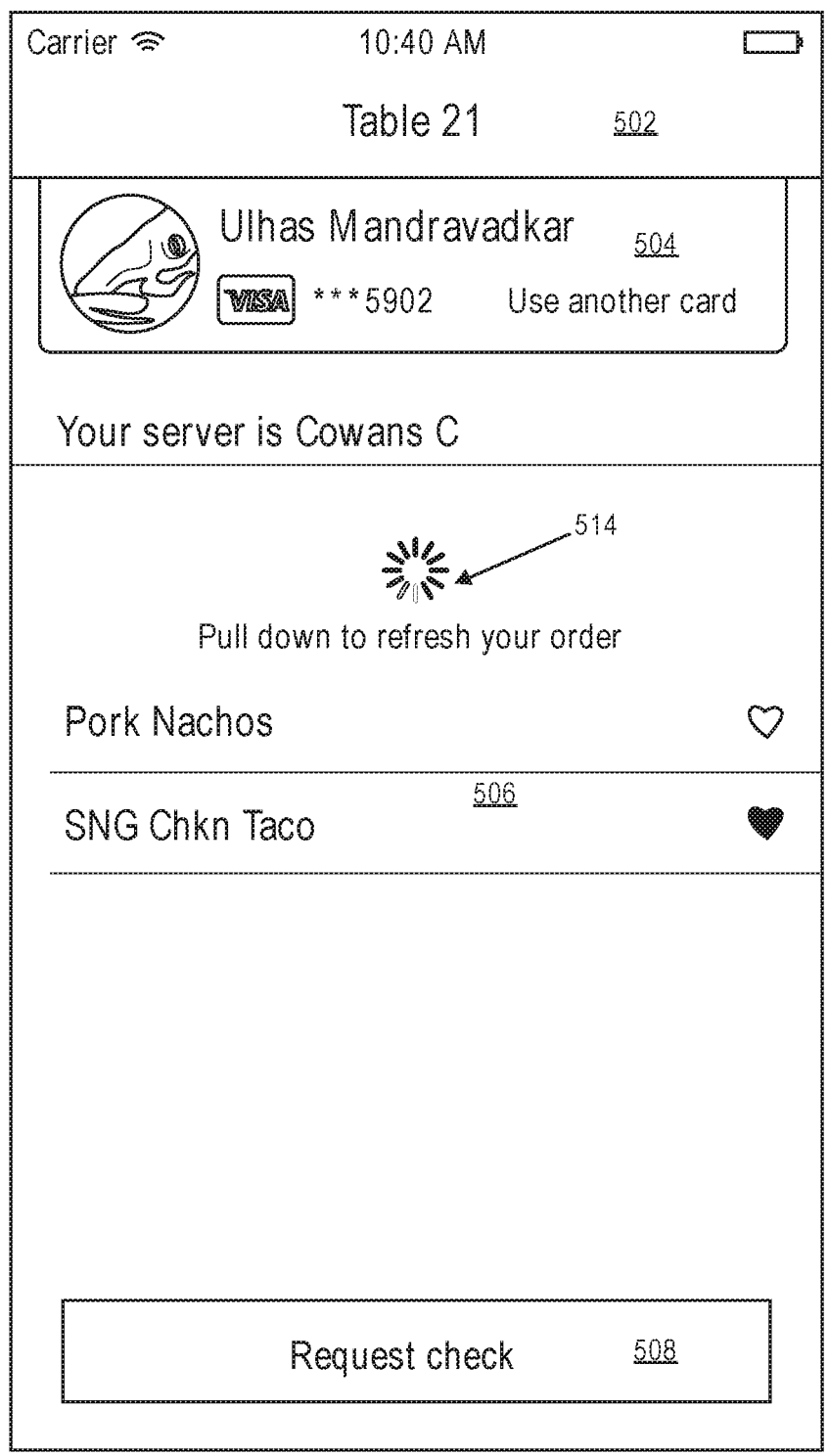

FIG. 5C illustrates a third example screen display that the mobile app may generate on a mobile computing device. In the example of FIG. 3, screen display 502 further comprises a refresh prompt message configured as "Pull down to refresh your order," and a refresh icon 514. In some embodiments, mobile app 103 is configured to respond to a user touch gesture in the form of dragging the order region 506 downward to cause updating the order region. In some embodiments, updating the order region 506 comprises the mobile app 103 generating and sending a message, via service provider computer system 130, to the booking application 116 and the payment plug-in 114, to initiate and send a new query to the merchant POS computer 112 to obtain then-current data associated with the ticket for the table. At this point in processing, the ticket number of the ticket associated with the table has been obtained in previous steps, and therefore the query for updated ticket details may include the ticket number.

Figure 5D:
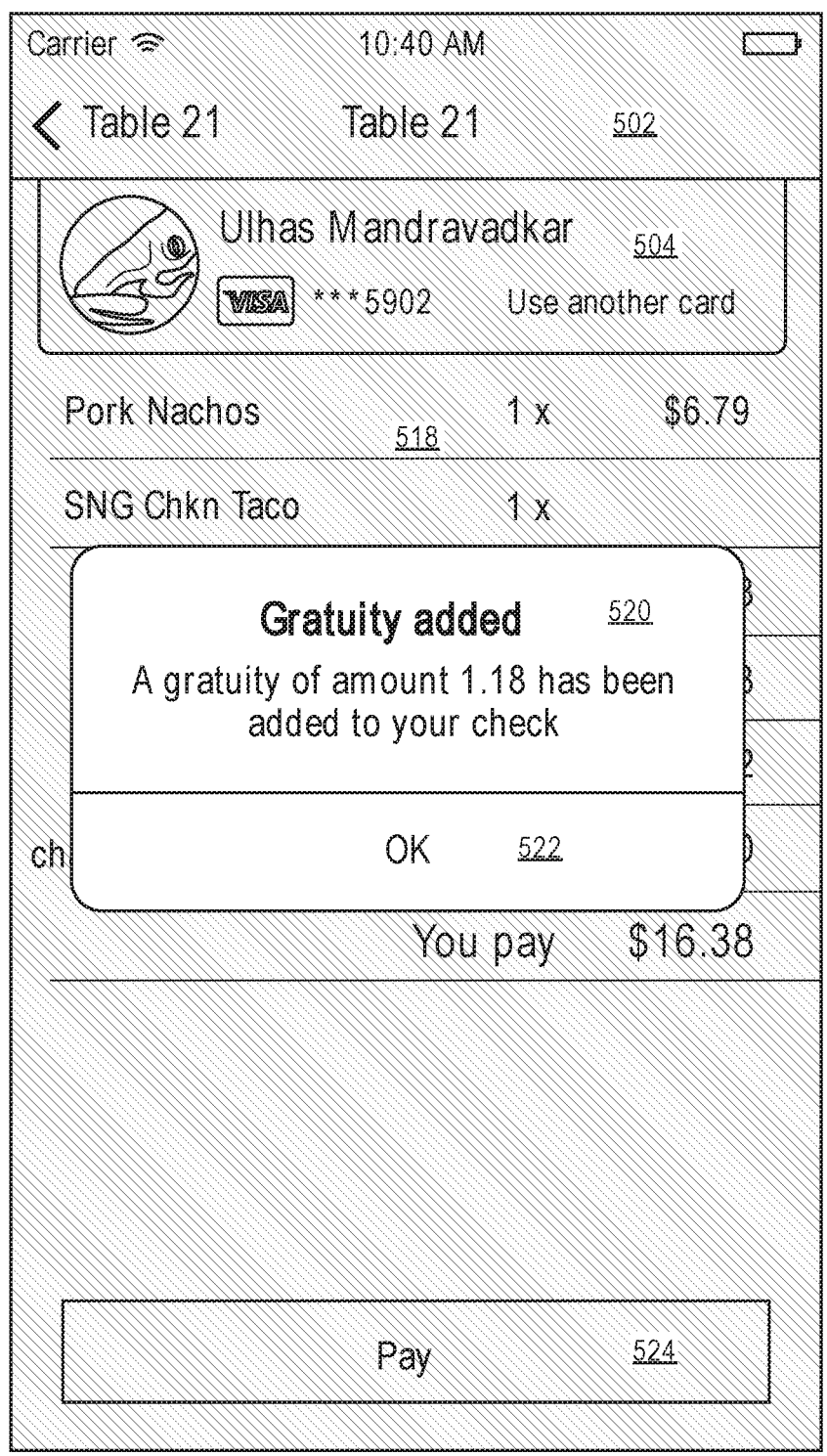

FIG. 5D illustrates a fourth example screen display that the mobile app may generate on a mobile computing device. FIG. 5D illustrates a screen display that may be generated by the mobile app 103 in response to user selection of the check request button 508. In this embodiment, the order region 506 is updated to comprise a completed guest check region 518 in which order line items include quantities, prices, tax, other fees, and a guest check total amount. In some embodiments, a tip or gratuity is automatically computed based upon a specified gratuity rate and added to the guest check and shown I the completed guest check region 518. In some embodiments, screen display 502 is displayed in a de-emphasized format such as grayed-out, and a gratuity notification 520 is displayed to indicate the gratuity amount that was added. Notification 520 may include an acknowledgment button 522 that is configured to dismiss the notification from the screen display in response to selection of the button.

The gratuity rate may be specified in configuration data, in a default value, and/or through aspects of the user interface that the mobile app 103 provides.

Figure 5E:

FIG. 5E illustrates a fifth example screen display that the mobile app may generate on a mobile computing device. In some embodiments, in response to dismissing the notification 520, the screen display 502 of FIG. 5E is displayed with the completed guest check region 518. In some embodiments, the completed guest check region 518 comprises a gratuity selection region 540 that is configured as a plurality of available gratuity rate value blocks, expressed as percentages of the total check amount, where each of the rate value blocks is a selectable GUI widget. In the example of FIG. 5E, available gratuity rates include 18%, 20%, and 25% of the check total; other embodiments may display other gratuity rates, based on configuration data or hard-coded default values in mobile app 103, according to local customs or practices. In some embodiments, selecting one of the gratuity selection regions 540 causes redisplaying screen display 502 in a form in which the newly selected gratuity rate is highlighted and the values in completed guest check region 518 are recalculated using the new gratuity rate.

FIG. 5D, 5E further comprise a pay button 524 configured as a selectable GUI widget. In some embodiments, selecting the pay button 524 causes the mobile app 103 to form and send a message to the service provider computer system 130 requesting initiation of a payment transaction. In response, the payment application 134 forms and sends a message to the payment gateway computer 140 requesting initiation of a payment transaction and providing the guest check amount, payment card information for the payment card that is currently configured for the user, and a beneficiary account for the restaurant. The beneficiary account number may be configured in database 136 at the time that a restaurant is enrolled for service in the service provider computer system 130.

Figure 5F:

FIG. 5F illustrates a sixth example screen display that the mobile app may generate on a mobile computing device. In some embodiments, a confirmation screen display 530 of FIG. 5F is displayed in response to selecting the pay button 524 and successfully performing a payment transaction. In some embodiments, confirmation screen display 530 comprises a confirmation notification 532 that specifies a confirmed payment amount, a check number, a restaurant identifier, and an e-mail address to which a confirmed receipt has been sent. One or more of the values may be omitted or changed in different embodiments.

In some embodiments, notification 532 further comprises a charge summary region 533 that presents the guest check amount, tip amount, total amount, and some or all of the account number that was charged. Values shown in summary region 533 may vary in different embodiments.

Further, in some embodiments a rating panel 534 is displayed in confirmation screen display 530 and prompts the user to rate the user's experience at the restaurant that was just patronized. Selecting a particular rating value icon, such as a star, in the rating panel 534 causes transmitting a corresponding rating value to the service provider computer 130, and in response, the booking application 132 may update rating values for the restaurant that are stored in database 136.

Figure 5G:
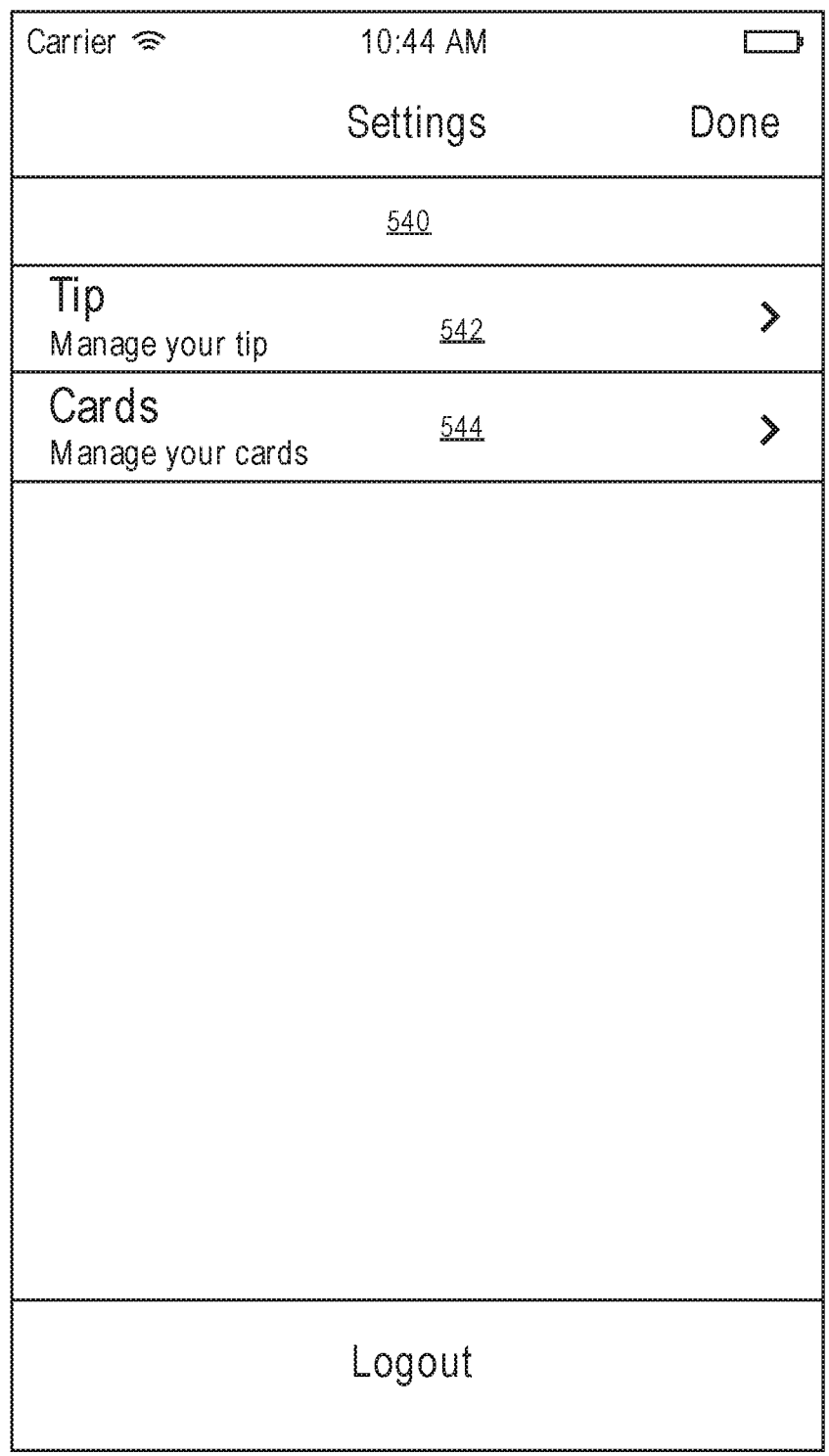

FIG. 5G illustrates a seventh example screen display that the mobile app may generate on a mobile computing device. In some embodiments, mobile app 103 is configured to provide one or more configuration functions that are accessible by selecting a Settings icon, and in response, a configuration screen display 540 is generated and displayed. In some embodiments, a Tip function 542 and Cards function 544 are displayed in selectable panels.

Figure 5H:
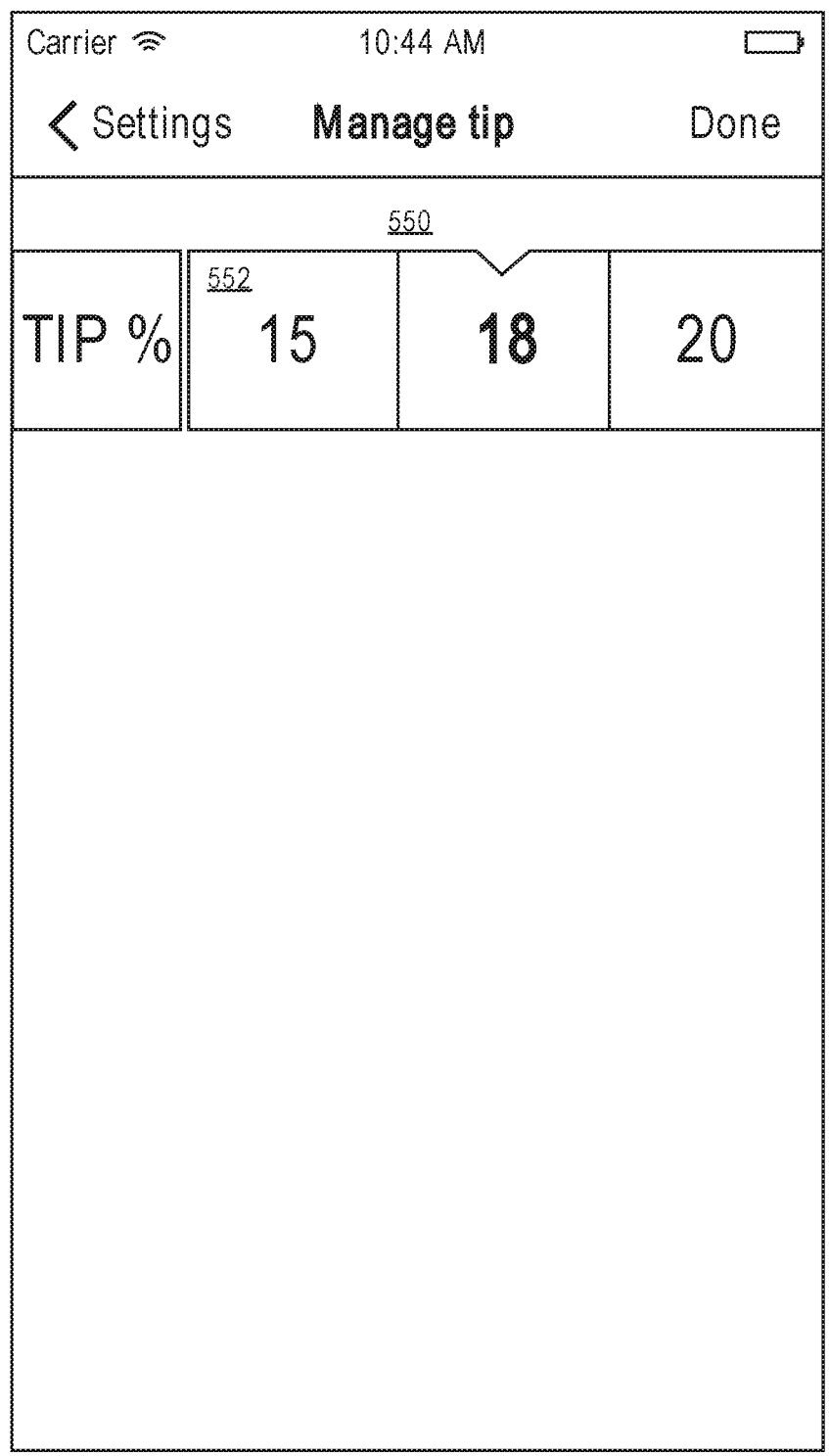

FIG. 5H illustrates an eighth example screen display that the mobile app may generate on a mobile computing device in response to selection of the Tip function 542 of FIG. 5G. In some embodiments, a Manage tip screen display 550 comprises a gratuity selection region 552 that is configured as a plurality of available gratuity rate value blocks, expressed as percentages of the total check amount, where each of the rate value blocks is a selectable GUI widget. In the example of FIG. 5H, available gratuity rates include 15%, 18%, and 20% of the check total; other embodiments may display other gratuity rates, based on configuration data or hard-coded default values in mobile app 103, according to local customs or practices. In some embodiments, selecting one of the blocks in gratuity selection regions 552 causes storing the associated tip value in non-volatile memory associated with the mobile app 103 as a default value, which is then used in later calculations of the tip amount for guest checks.

Figure 5J:
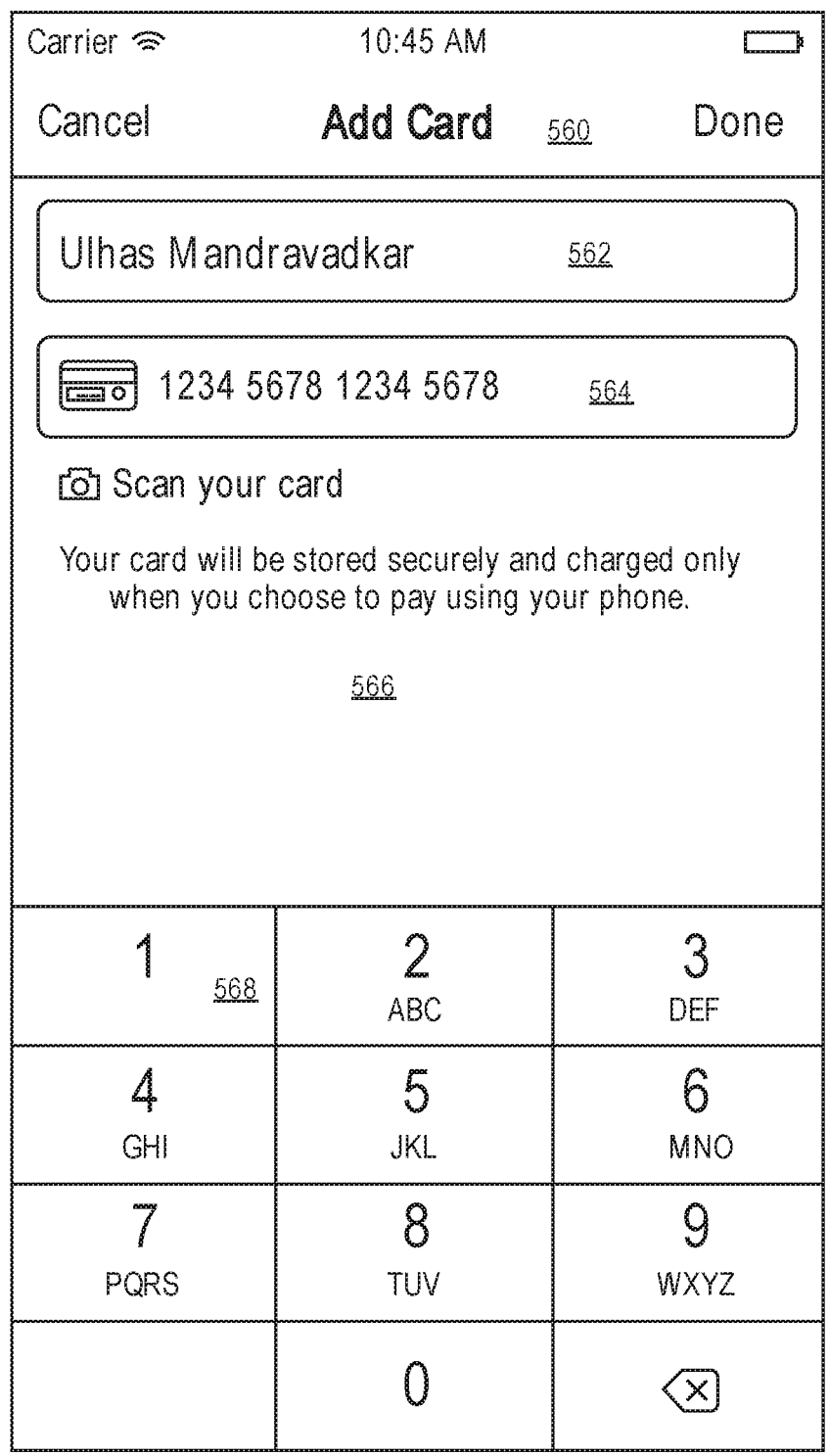
Figure 5K:
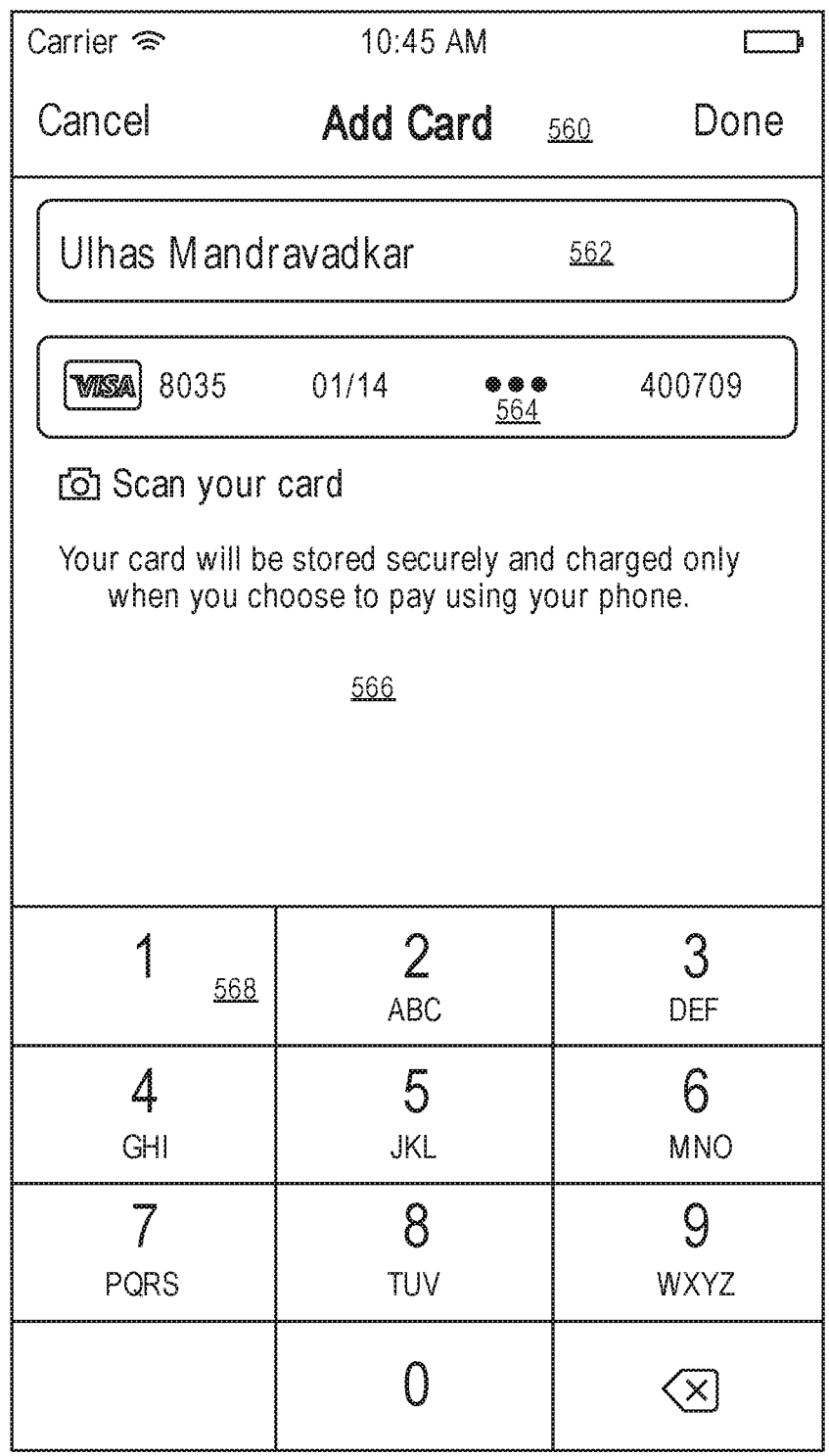

FIG. 5J illustrates a ninth example screen display that the mobile app may generate on a mobile computing device in response to selection of the Cards function 544 (FIG. 5G). FIG. 5K illustrates a tenth example screen display that may be generated during entry of a card.

Referring first to FIG. 5J, In some embodiments, an Add Card screen display 560 is generated and comprises a name panel 562, a payment card account number panel 564, a prompt region 566, and a virtual keypad 568. In some embodiments, the name panel 562 is configured to display a name of an account that is associated with the payment card, typically a cardholder name as it appears in payment card account information of an issuing bank. The payment card account number panel 564 indicates some or all of the account number of a payment card that has been or is being configured for use for payment of later transactions. The prompt region 566 may comprise a message such as "Scan your card" that prompts the user to use a camera of the smartphone to capture an image of a payment card. The virtual keypad 568 is configured with touch-sensitive numeric digit blocks which when selected cause entering a payment card number in the number panel 564, as seen in FIG. 5K.

2.6 Ticket States

Figure 6:
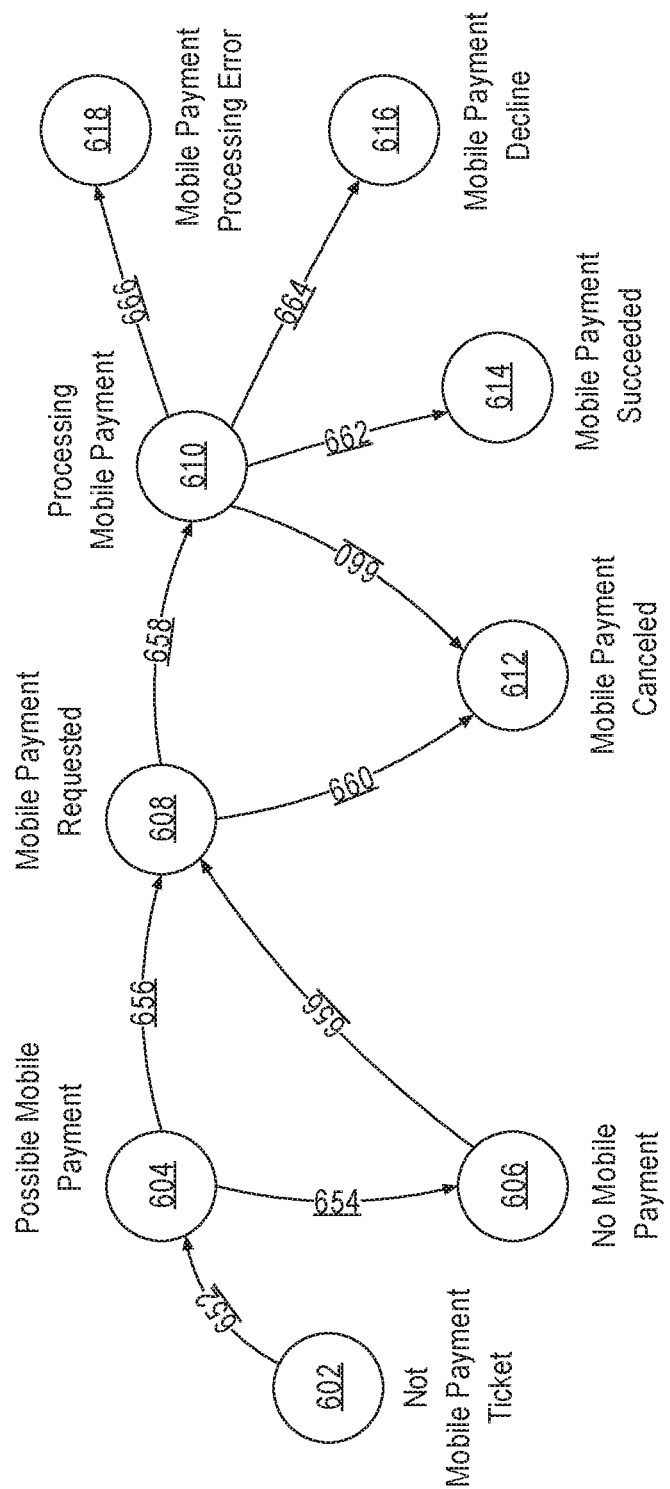
FIG. 6 is a state diagram of various possible states and state transitions for a ticket at merchant POS computer, according to some embodiments of the invention.

FIG. 6 is a state diagram of various possible states and state transitions for a ticket at merchant POS computer 112. The current state of a ticket may be maintained and represented as data stored in memory of merchant POS computer 112 and/or in a database operatively coupled to merchant POS computer 112.

In some embodiments, the current state of a ticket is represented by a ticket item specially designated to represent the state and added to the ticket. For example, if the ticket is a restaurant ticket, the specially designated ticket item can be specially designated menu item.

State transitions between ticket states can be represented by removing the specially designated ticket item representing the current state from the ticket and adding the specially designated ticket item representing the new state to the ticket. In some embodiments, the adding and removing of ticket items is performed by the POS plugin 114 interfacing with an API offered by the merchant POS computer 112.

In some embodiments, the current state of a ticket is visually represented on a video display of the merchant POS computer 112 as part of a graphical user interface presented on the video display. By doing so, staff can visually discern the current state of the ticket including whether the ticket is or not designated for mobile payment. The visual representation of the current state can take any suitable form including by appropriate text, color, highlighting, animation, icon, or other graphical user interface representation suitable for visually conveying the current ticket state.

State 602 represents a ticket that is open at merchant POS computer 112 but is not a mobile payment ticket. State 602 may correspond to a state of a ticket in an ordinary merchant POS computer that does not have a plug-in or does not have mobile payment capabilities or is otherwise not integrated with a mobile payment service provider computer system.

State 604 represents a ticket at merchant POS computer 112 that has been designated as possibly being paid by mobile payment. For example, the ticket may transition 652 to state 604 in response to merchant POS computer 112 or plug-in 114 receiving or obtaining an indication from service provider computer system 130 that the ticket has been matched to a reservation record as described above with respect to block 224 of FIG. 2.

State 606 represents a ticket which will not be paid by mobile payment. For example, the ticket may transition 654 to state 606 in response to merchant POS computer 112 or plug-in 114 receiving or obtaining an indication from service provider computer system 130 that the ticket will not be paid by mobile payment. For example, service provider computer system 130 may send this indication after receiving confirmation from user of mobile computing device 102 that the ticket will not be paid by mobile payment. For example, after the ticket has been matched to a reservation record as in block 224 of FIG. 2, service provider computer system 130 may send ticket data for the ticket to the mobile computing device 102 and thereby cause the mobile application 103 to prompt the user of mobile computing device 102 confirm whether mobile payment will be used to pay the matched ticket. If the user declines to pay by mobile payment with corresponding user input to the mobile application 103, the mobile application 103 in response can notify the service provider computer system 130 which in turn can notify the merchant POS computer 112 or plug-in 114 that mobile payment will not be used to pay the ticket.

State 608 represents a ticket for which mobile payment has been requested. For example, the ticket may transition 656 to state 608 in response to merchant POS computer 112 or plug-in 114 receiving or obtaining an indication from service provider computer system 130 that the user of mobile computing device 102 has requested mobile payment. For example, service provider computer system 130 may send this indication after receiving or obtaining a mobile payment request from the mobile computing device 102 as in step 414 of FIG. 4A. As another example, service provider computer 130 may send this indication after receiving or obtaining a mobile payment request from the mobile computing device 102 as in step 414 of FIG. 4A, but only after successfully authorizing payment for the expected ticket amount as in block 426 of FIG. 4B.

State 610 represents a ticket for which mobile payment is being processed. For example, the ticket may transition 658 to state 610 in response to a staff person closing the ticket at merchant POS computer 112 as in block 632 of FIG. 6B. Alternatively, the ticket may transition 658 to state 610 in response to merchant POS computer 114 or plug-in 114 receiving or obtaining an indication from service provider computer system 130 that payment is being processed. For example, service provider computer system 130 may send this indication after initiating capture of payment for the final total ticket amount as in block 636 of FIG. 6B.

State 612 represents a ticket for which mobile payment has been canceled, either after mobile payment has been requested or while mobile payment is being processed. For example, the ticket may transition 660 to state 612 in response to merchant POS computer 112 or plug-in 114 receiving or obtaining an indication from service provider computer 130 that mobile payment is to be canceled. For example, service provider computer 130 may send this indication after receiving a mobile payment cancellation request from mobile computing device 102.

State 614 represents a ticket for which payment has been successfully processed. For example, the ticket may transition 662 to state 614 in response to merchant POS computer 112 or plugin-114 receiving or obtaining an indication from service provider computer 130 that payment capture for the final total ticket amount was successful as in block 638 of FIG. 6B.

State 616 represents a ticket for which payment of the final total ticket amount was declined by the payment processing network computer 140. For example, the ticket may transition 664 to state 616 in response to merchant POS computer 112 or plugin-114 receiving or obtaining an indication from service provider computer 130 that the customer's payment card was declined by the payment processing network computer 140.

State 618 represents a ticket for which mobile payment processing failed because, for example, of a network communication problem, issue, or error. For example, the ticket may transition 666 to state 618 in response to merchant POS computer 112 or plugin-114 receiving or obtaining an indication from service provider computer 130 that the service provider computer 130 was unable to communicate over a network with the payment processing network computer 140. As another example, the ticket may transition 666 to state 618 in response to merchant POS computer 112 or plugin-114 detecting the inability to communicate over a network with service provider computer system 130.

2.7 Example Screen Displays

FIG. 7A, FIG. 7B, FIG. 7C, FIG. 7D, FIG. 7E, FIG. 7F, FIG. 7G, FIG. 7H, FIG. 7J, FIG. 7K, FIG. 7L depict example screen displays that a mobile app may generate and display using a mobile computing device such as a smartphone in connection with payment functions, according to some embodiments of the invention. For example, the example screen displays may be generated and displayed by app 103 using computing device 102 or 104.

Figure 7A:
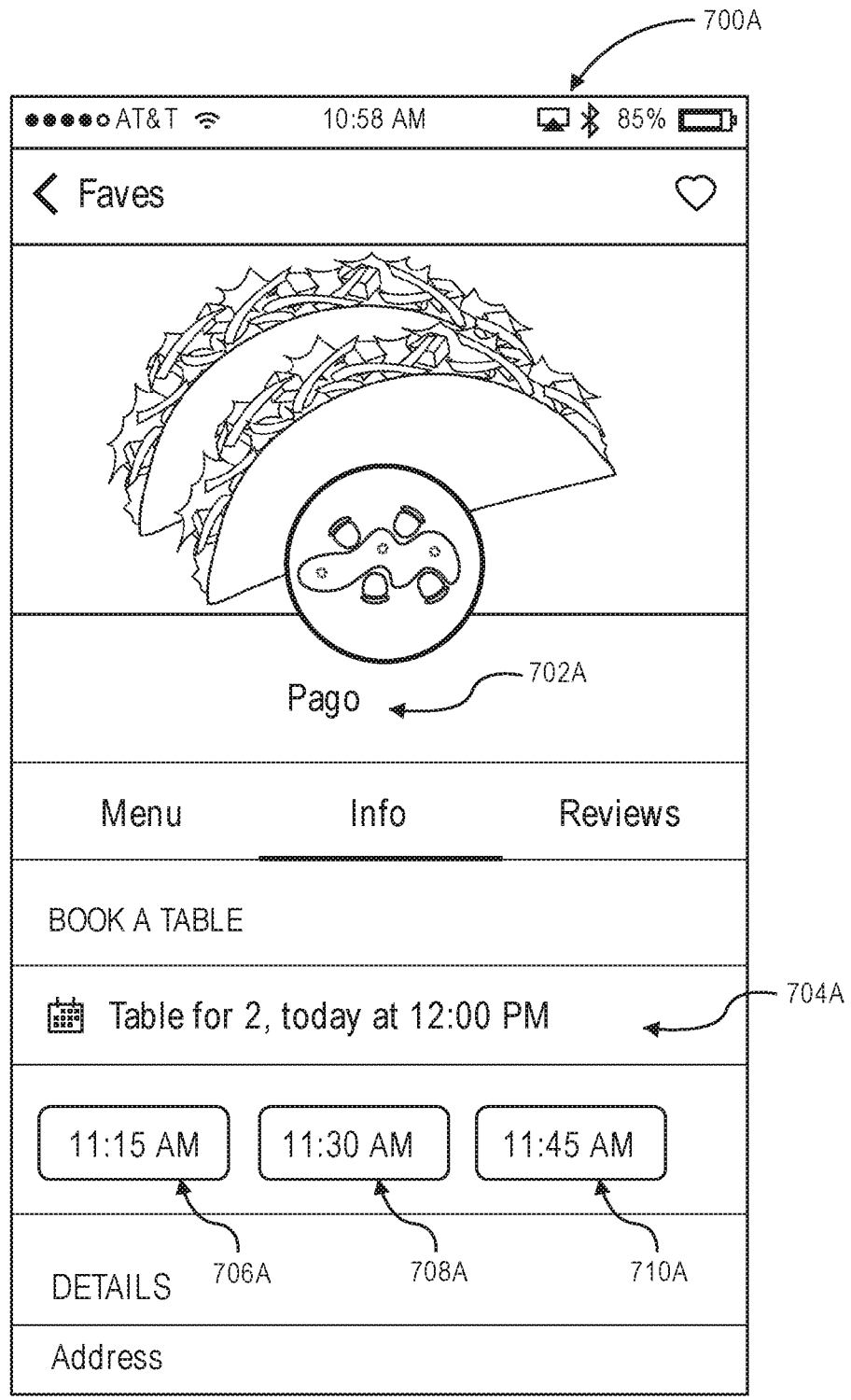
FIG. 7A, FIG. 7B, FIG. 7C, FIG. 7D, FIG. 7E, FIG. 7F, FIG. 7G, FIG. 7H, FIG. 7J, FIG. 7K, FIG. 7L depict example screen displays that a mobile app may generate and display using a mobile computing device such as a smartphone in connection with payment functions, according to some embodiments of the invention.

The example mobile application screen display depicted in FIG. 7A includes graphical user interface (GUI) 700A. GUI 700A includes merchant indicator 702A, reservation query indicator 704A, and selectable reservation buttons 706A, 708A, and 710A. Merchant indicator 702A indicates with the text "Pago" a fictitious restaurant at which a reservation is about to be made using the mobile application. Merchant indicator 702A can instead be an icon or a graphic or other visual indicator of the merchant. Reservation query indicator 704A indicates that a user wants to reserve a table at Pago restaurant for two persons for today at 12:00 PM. Selectable reservation buttons 706A, 708A, and 710A indicate availability at Pago for a table of two persons for today at 11:15 AM, 11:30 AM, and 11:45 AM, respectively.

Figure 7B:
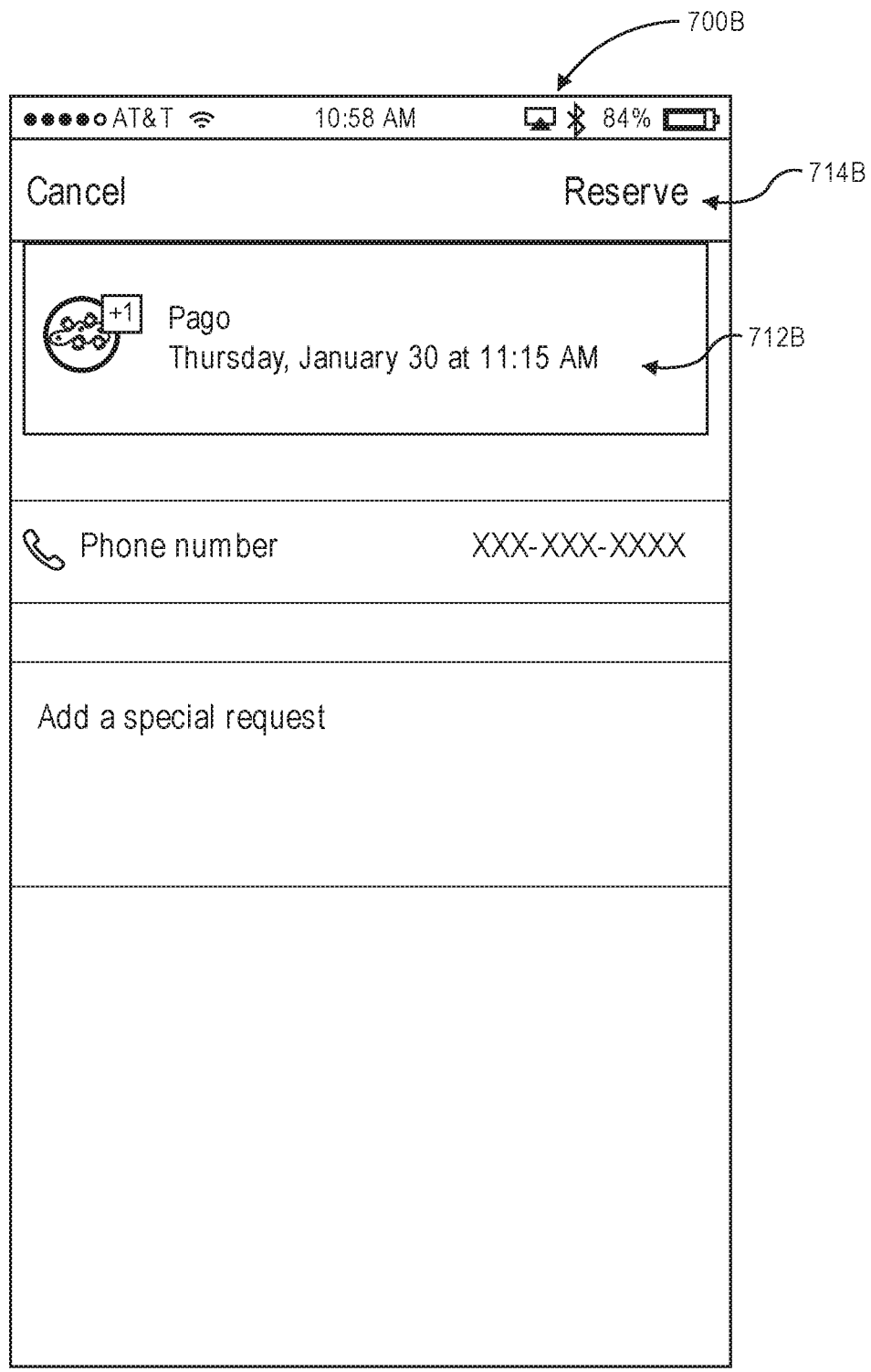

The example mobile application screen display depicted in FIG. 7B includes GUI 700B displayed in response to the user selecting reservation button 706A in GUI 700A. GUI 700B includes selected reservation time indicator 712B and selectable "Reserve" button 714B for reserving the selected reservation time.

Figure 7C:
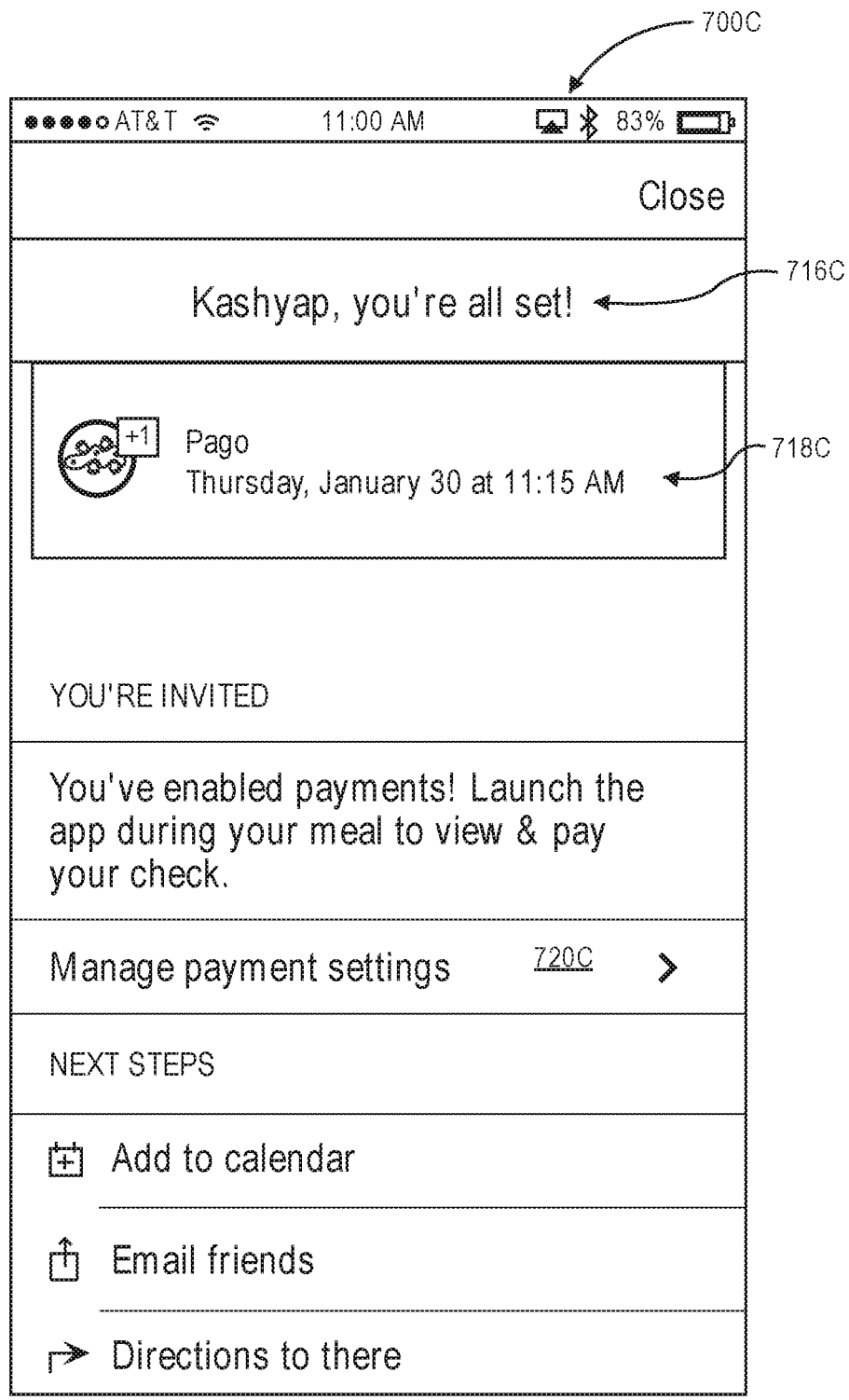

The example mobile application screen display depicted in FIG. 7C includes GUI 700C displayed in response to the user selecting "Reserve" button 714B in GUI 700B. GUI 700C includes reservation confirmation message 716C for fictitious user named "Kashyap", confirmed reservation time message 718C, and selectable manage payment settings region 720C.

Figure 7D:
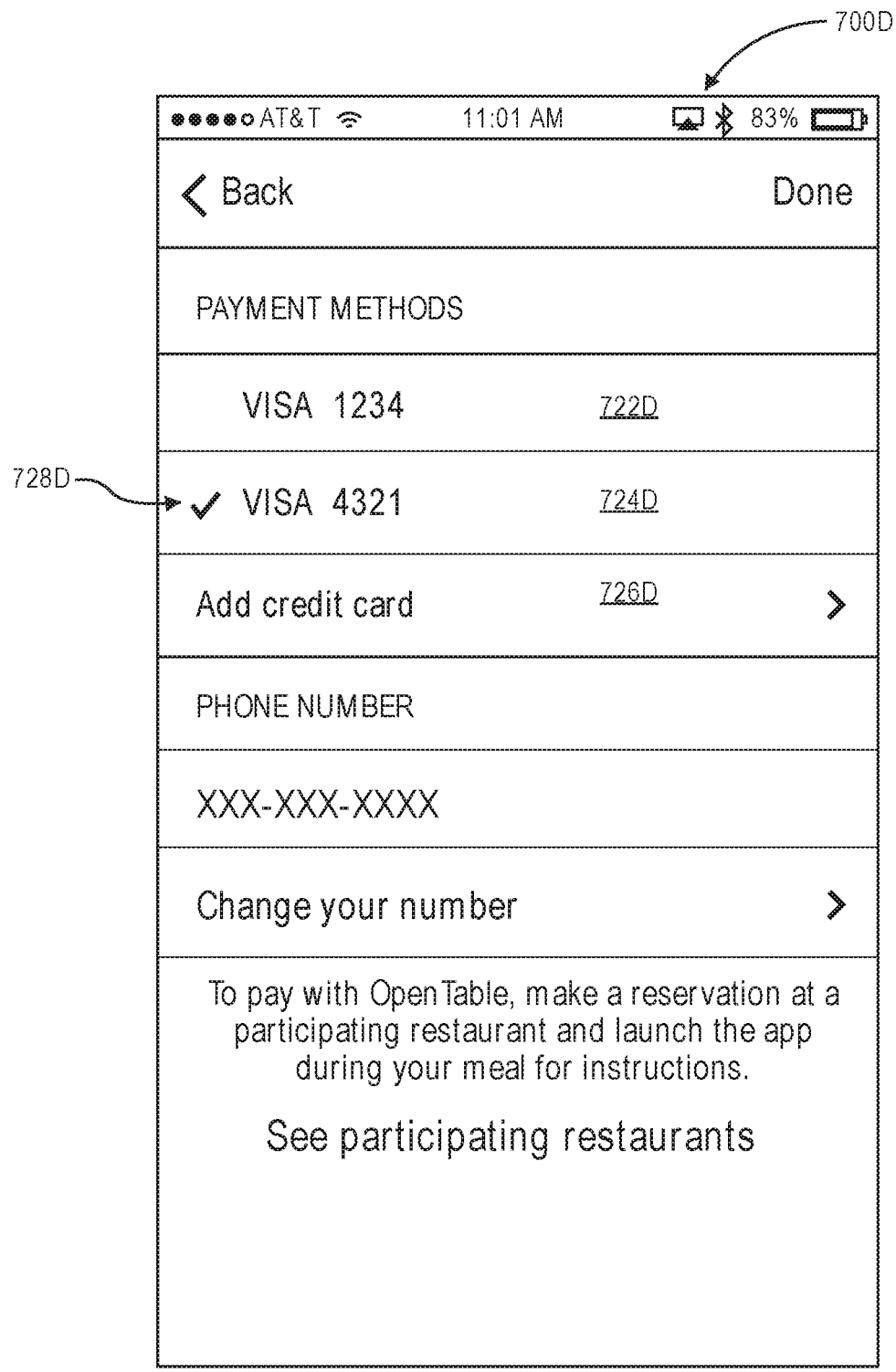

The example mobile application screen display depicted in FIG. 7D includes GUI 700D displayed in response to the user selecting manage payment settings region 720C in GUI 700C. GUI 700D includes selectable payment method regions 722D and 724D for selecting a pre-configured payment method associated with the user's account to use as the default payment method for mobile payments. Selectable payment method region 724D corresponds to a currently selected default payment method as indicated by checkmark 728D. Selectable add credit card region 726D is for adding a new selectable payment method to associate with the user's account.

Figure 7E:
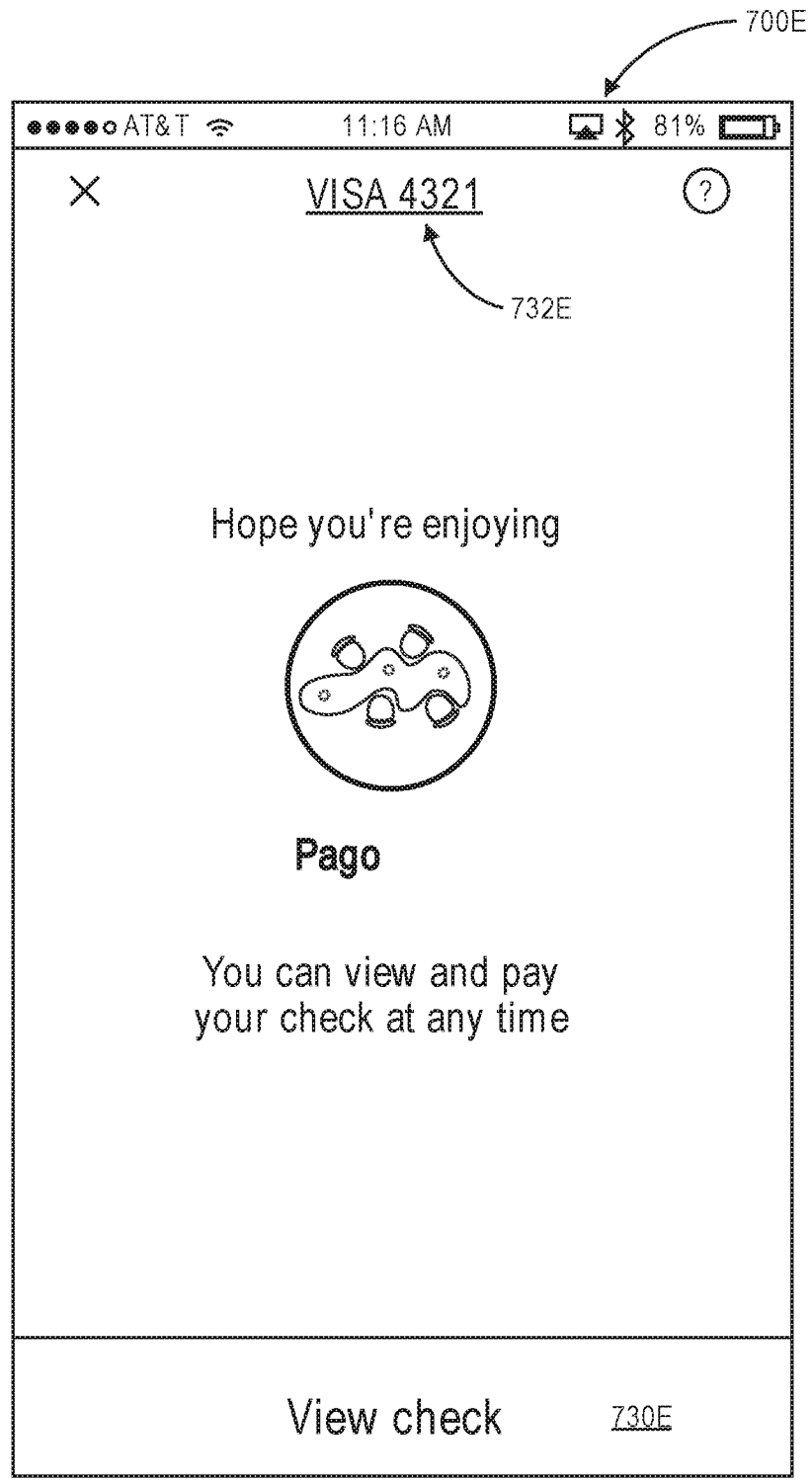

The example mobile application screen display depicted in FIG. 7E includes GUI 700E displayed after the user has arrived and checked-in at the restaurant to claim his reservation. GUI 700E include selectable view current check region 730E and currently selected payment method indicator 732E. In some embodiments, currently selected payment method indicator 732E is selectable by the user. Upon selection, GUI 700D or similar GUI for selecting a new payment method may be generated and displayed to the user.

Figure 7F:
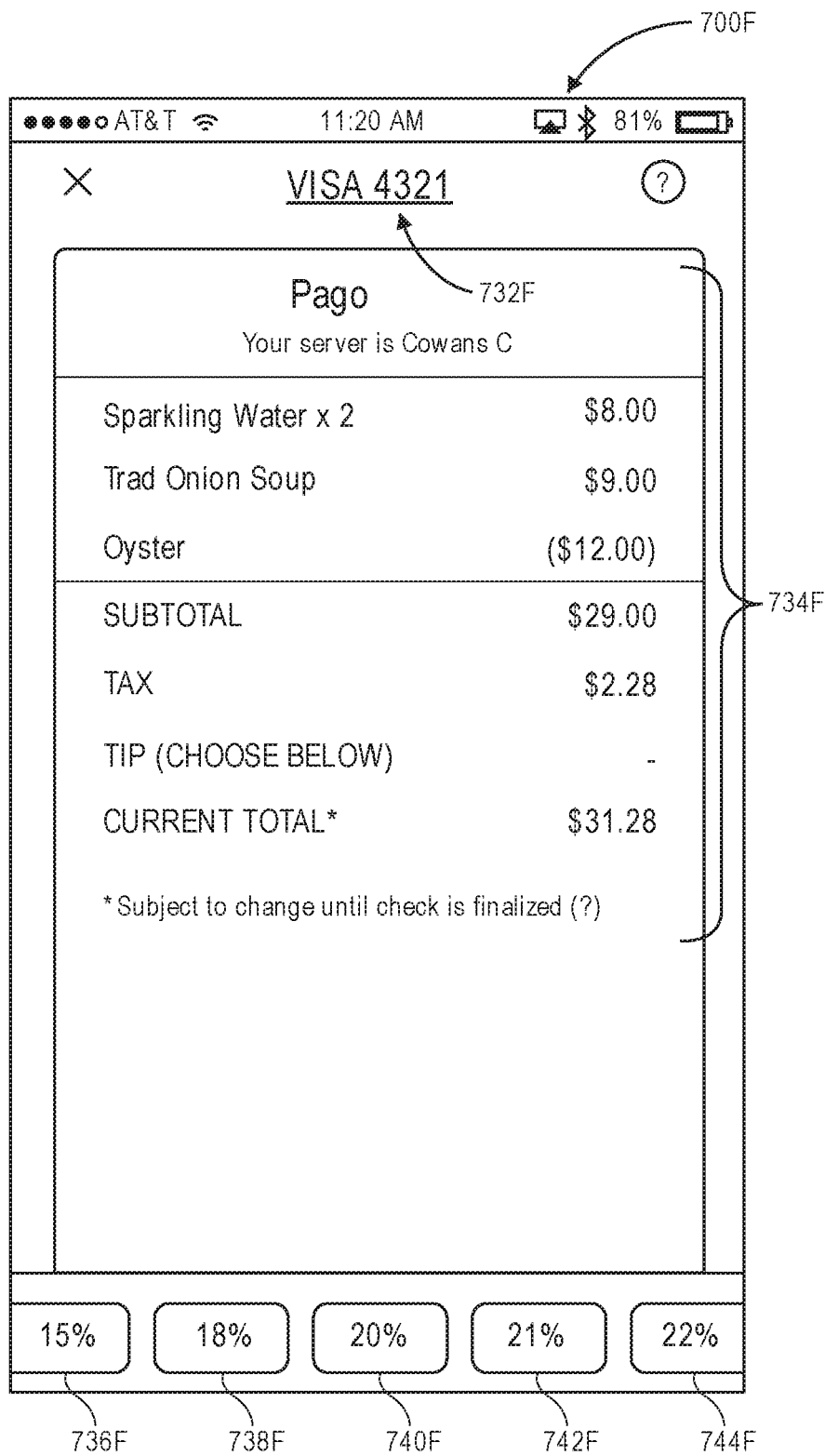

The example mobile application screen display depicted in FIG. 7F includes GUI 700F displayed in response to the user selecting view current check region 730E in GUI 700E. GUI 700F includes current open ticket information 734F and currently selected payment method indicator 732F. Current open ticket information 734F indicates a current total ticket amount of $31.28. GUI 700F also includes selectable add percentage tip amount buttons 736F, 738F, 740F, 742F, 744F for adding a 15%, 18%, 20%, 21%, or 22% tip amount to the current total ticket amount of $31.28, respectively.

Figure 7G:
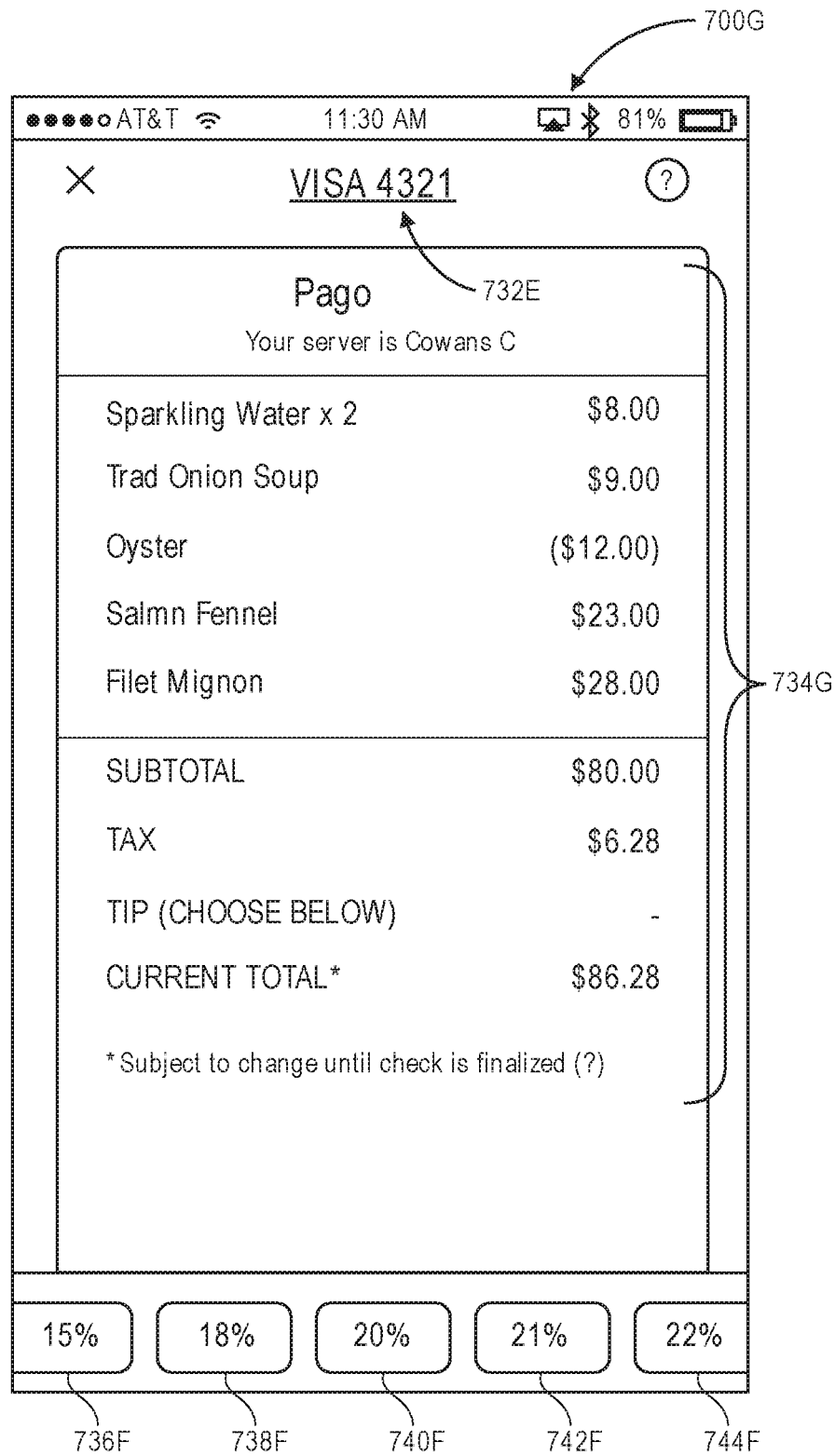

The example mobile application screen display depicted in FIG. 7G includes GUI 700G displayed after two menu items ("Salmn Fennel" and "Filet Mignon") have added to the open ticket at a merchant POS computer. GUI 700G includes current open ticket information 734G and currently selected payment method indicator 732G. Current open ticket information 702G indicates a current total ticket amount of $86.28 after the new menu items have been added and the tax recalculated. GUI 700G also includes selectable add percentage tip amount buttons 736G, 738G, 740G, 742G, 744G for adding a 15%, 18%, 20%, 21%, or 22% tip amount to the current total ticket amount of $86.28, respectively.

Figure 7H:
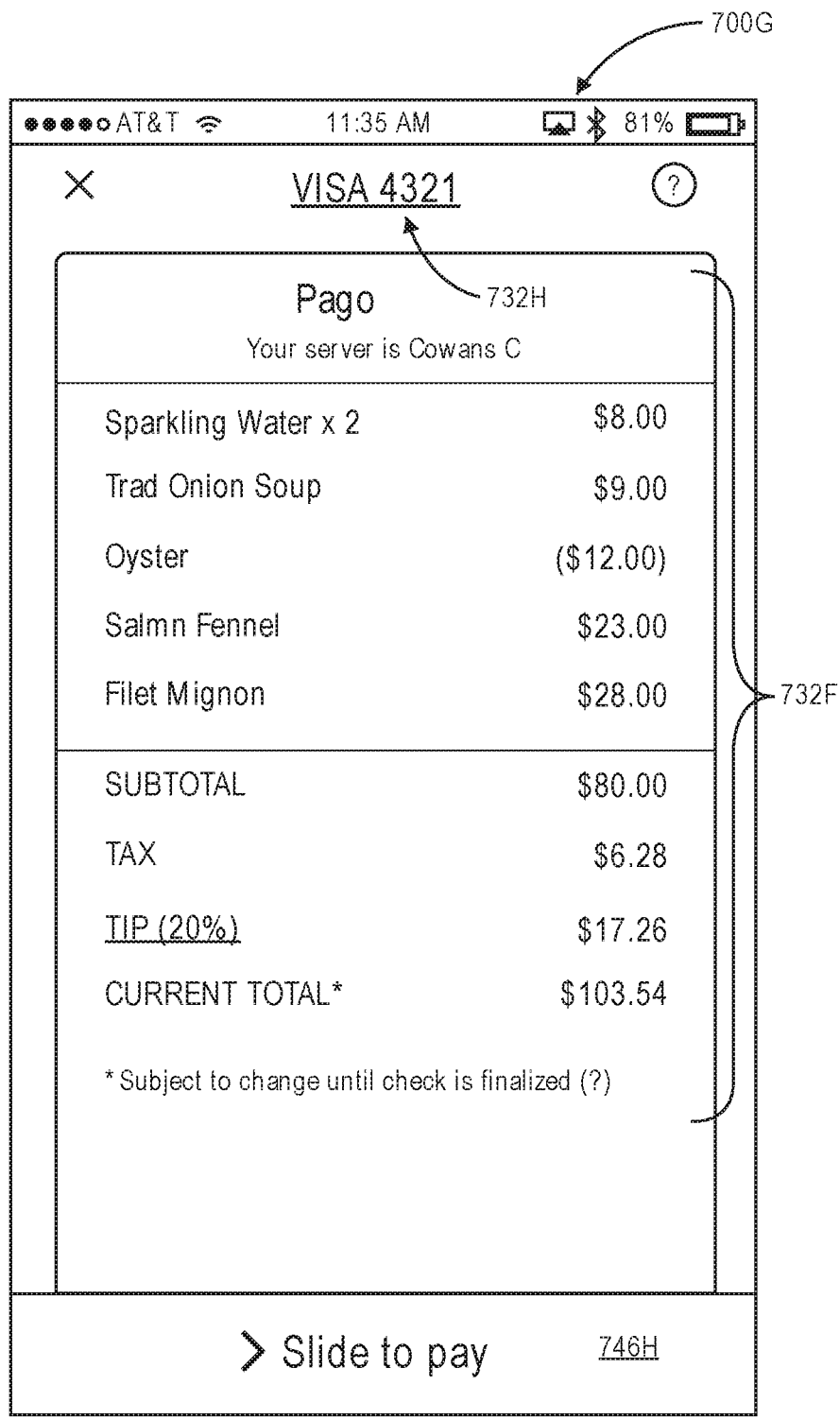

The example mobile application screen display depicted in FIG. 7H includes GUI 700H displayed in response to the user selecting add percentage tip amount button 740G of GUI 700G. GUI 700G includes current open ticket information 734H and currently selected payment method indicator 732H. Current open ticket information 734H indicates a current total ticket amount of $103.54 after a 20% tip amount has been added to the ticket. GUI 700H also includes selectable slide to pay region 746H.

Figure 7J:
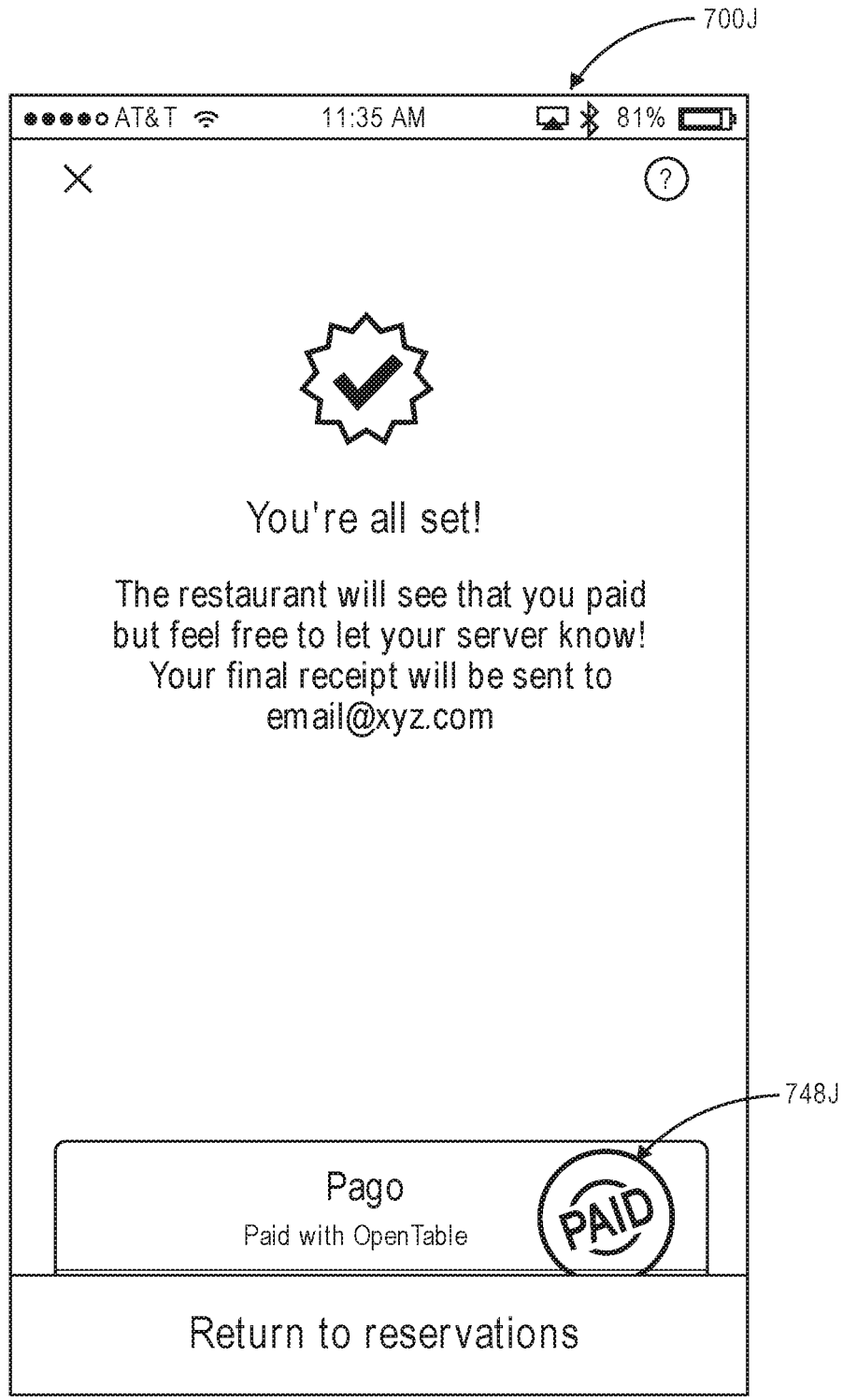

The example mobile application screen display depicted in FIG. 7J includes GUI 700J displayed in response to the user selecting slide to pay region 746H of GUI 700H. GUI 700H includes "paid" indicator 748J indicating that payment of at least $103.54 by the user's currently selected payment method has been authorized but not captured with a payment network gateway computer in accordance with some mobile payment embodiments described above.

Figure 7K:
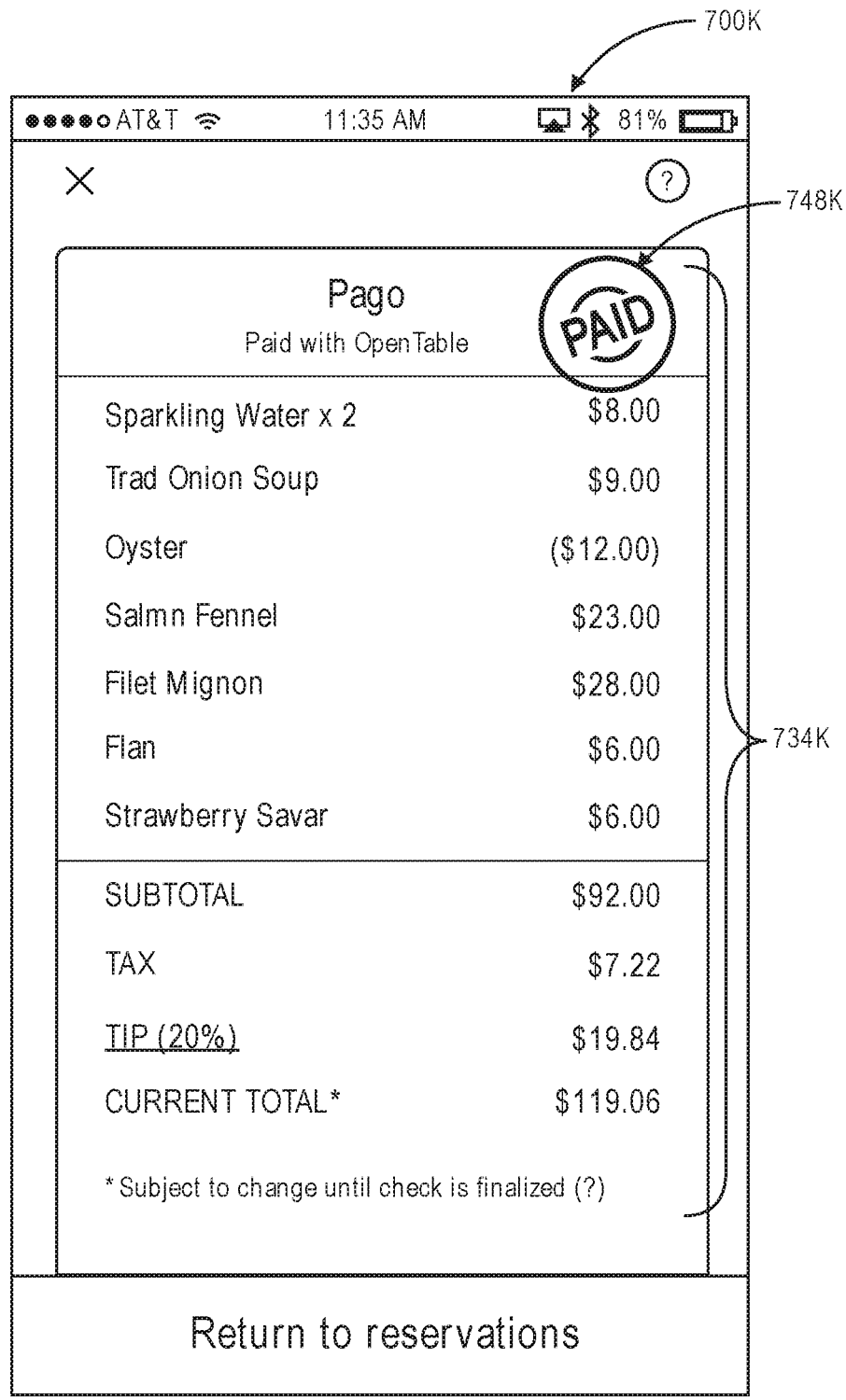

The example mobile application screen display depicted in FIG. 7K includes GUI 700K displayed after two dessert items ("Flan" and "Stawberry Savar") have been added to the open ticket at the merchant POS computer. GUI 700K includes "paid" indicator 748K indicating that payment of at least $103.54 by the user's currently selected payment method has been authorized but not captured with a payment network gateway computer in accordance with some mobile payment embodiments described above. GUI 700K also include current open ticket information 734K. Current open ticket information 734K indicates a current total ticket amount of $119.06 after the two dessert items have been added and the tax and tip recalculated.

Figure 7L:
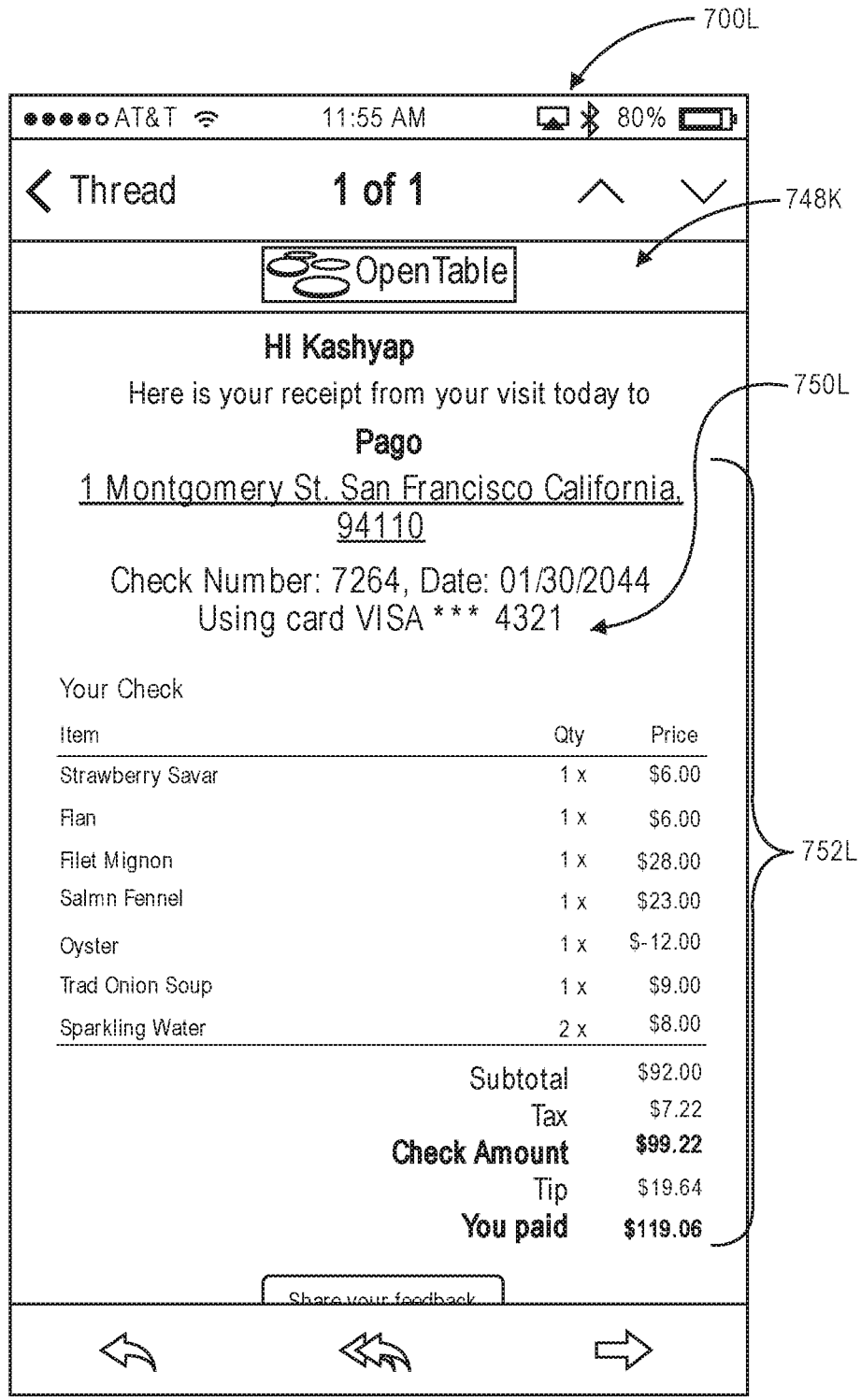

The example mobile application screen display depicted in FIG. 7L includes GUI 700L displayed after the final total ticket amount of $119.06 has been captured from the user's currently selected payment method with the payment network gateway computer. GUI 700L includes payment method indicator 750L from which the final total ticket amount was captured in accordance with some mobile payment embodiments described above. GUI 700L also includes closed ticket information 752L.

FIGS. 8A and 8B depict example video screen displays that a point-of-sale application may generate and display using a merchant point-of-sale computer, according to some embodiments of the invention.

The example video screen display depicted in FIG. 8A includes GUI 800A. GUI 800A displays the ticket at the merchant point-of-sale computer when in a ticket state corresponding to state 608 of FIG. 6. The displayed ticket includes a no cost line item labeled "OTPay Authed" indicating that the user has requested mobile payment and payment for an expected total ticket has been successfully authorized. Note that in accordance with some embodiments of the mobile payment approach described herein, the expected total ticket amount for which payment has been authorized may be based on a current total ticket amount before the "Strawberry Savar" and "Flan" items are added.

The example video screen display depicted in FIG. 8B includes GUI 800B. GUI 800B displays the ticket at the merchant point-of-sale computer when in a ticket state corresponding to state 614 of FIG. 6. The displayed ticket includes a no cost line item labeled "OTPay Processing" to indicate that the ticket had been in a ticket state corresponding to state 610 of FIG. 6 before transitioning 662 to state 614 of FIG. 6 as indicated by no cost line item labeled "OT PAID".

2.8 Implementation Example—Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which some embodiments of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to some embodiments, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

2.9 Interpretation of Terms

In the appended claims, any clause, element or limitation of a claim that does not include the words "means for" is not intended to invoke or to be construed under 35 U.S.C. § 112(f). In the appended claims, any clause, element or limitation that is expressed as a thing for performing or configured to perform a specified function without the recital of structure, material or acts in support thereof is intended to be construed to cover the corresponding structure, material or acts described in the specification, and any other structure, material or acts that were known or in use as of the priority date to which this patent document is entitled or reasonably foreseeable to those of ordinary skill in the art in view of the disclosure as a whole herein, and equivalents thereof.

The term "and/or" as used in the foregoing specification and the appended claims refers to and encompasses any and all possible combinations of one or more of the associated listed items.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
   sending, by one or more computers and to a first computing device associated with a first identifier, a request for a transaction ticket that (i) is associated with a location identifier assigned for a time of service by a merchant, and (ii) was matched with an order that is associated with the location identifier, the request having a generic data format that, when received by any of a plurality of different computing devices including the first computing device, causes the computing device to translate, using a device specific library, at least a portion of the request that is in the generic data format into one or more device specific queries that are not in the generic data format to obtain requested data from memory included in the computing device, at least some of the plurality of different computing devices having different device specific libraries;
   receiving, by the one or more computers and from the first computing device, ticket data that (a) was translated into the generic data format by the first computing device after the first computing device obtained the requested data from the memory included in the first computing device and (b) comprises data for one or more items in the transaction ticket
   transmitting, by the one or more computers and to a second first computing device associated with a second identifier, the ticket data, wherein the second computing device was determined using the location identifier;
   in response to transmitting the ticket data, receiving, by the one or more computers and from the second computing device, a request to pay a payment amount based on the ticket data; and
   transmitting, by the one or more computers and to a payment system, a payment transaction comprising the payment amount, the second identifier indicating a payer of the payment transaction, and the first identifier indicating a beneficiary of the payment transaction.

2. The method of claim 1, wherein (i) the payer of the payment transaction is a customer and (ii) the beneficiary of the payment transaction is a restaurant of a merchant.

3. The method of claim 2, wherein (i) the first computing device comprises a merchant point-of-sale computer associate with the merchant, and (ii) the location identifier identifies a table at the restaurant of the merchant where the customer is served by the merchant.

4. The method of claim 2, wherein (i) the first computing device comprises a booking computer of the merchant, (ii) the transaction ticket was matched with a reservation record for the customer, and (iii) reservation record was generated by the booking computer in response to receiving a reservation request for the restaurant of the merchant.

5. The method of claim 1, wherein the order comprises the second identifier.

6. The method of claim 1, wherein the second identifier comprises one or more of a token associated with a credit card, a name of a customer, or another customer identifier.

7. The method of claim 1, wherein the ticket data comprises an estimated total ticket amount that is different than the payment amount.

8. The method of claim 1, wherein the payment transaction causes payment of the payment amount to be captured for a merchant from a payment account of a customer.

9. The method of claim 1, further comprising:
   publishing, to a HyperText Transfer Protocol (HTTP) long polling channel subscribed to by the first computing device, a mobile payment indication associated with the transaction ticket.

10. The method of claim 1, wherein the device specific library comprises a plug-in.

11. A system comprising one or more computers and one or more storage devices on which are stored instructions that are operable, when executed by the one or more computers, to cause the one or more computers to perform operations comprising:

sending, by the one or more computers and to a first computing device associated with a first identifier, a request for a transaction ticket that (i) is associated with a location identifier assigned for a time of service by a merchant, and (ii) was matched with an order that is associated with the location identifier, the request having a generic data format that, when received by any of a plurality of different computing devices including the first computing device, causes the computing device to translate, using a device specific library, at least a portion of the request that is in the generic data format into one or more device specific queries that are not in the generic data format to obtain requested data from memory included in the computing device, at least some of the plurality of different computing devices having different device specific libraries;

receiving, by the one or more computers and from the first computing device, ticket data that (a) was translated into the generic data format by the first computing device after the first computing device obtained the requested data from the memory included in the first computing device and (b) comprises data for one or more items in a transaction ticket transmitting, by the one or more computers and to a second first computing device associated with a second identifier, the ticket data, wherein the second computing device is determined using the location identifier;

in response to transmitting the ticket data, receiving, by the one or more computers and from the second computing device, a request to pay a payment amount based on the ticket data; and transmitting, by the one or more computers and to a payment system, a payment transaction comprising the payment amount, the second identifier indicating a payer of the payment transaction, and the first identifier indicating a beneficiary of the payment transaction.

12. The system of claim 11, wherein (i) the payer of the payment transaction is a customer and (ii) the beneficiary of the payment transaction is a restaurant of a merchant.

13. The system of claim 12, wherein (i) the first computing device comprises a merchant point-of-sale computer associate with the merchant, and (ii) the location identifier identifies a table at the restaurant of the merchant where the customer is served by the merchant.

14. The system of claim 12, wherein (i) the first computing device comprises a booking computer of the merchant, (ii) the transaction ticket was matched with a reservation record for the customer, and (iii) reservation record was generated by the booking computer in response to receiving a reservation request for the restaurant of the merchant.

15. The system of claim 11, wherein the order comprises the second identifier.

16. The system of claim 11, wherein the second identifier comprises one or more of a token associated with a credit card, a name of a customer, or another customer identifier.

17. The system of claim 11, wherein the ticket data comprises an estimated total ticket amount that is different than the payment amount.

18. The system of claim 11, wherein the payment transaction causes payment of the payment amount to be captured for a merchant from a payment account of a customer.

19. A non-transitory computer storage medium encoded with instructions that, when executed by one or more computers, cause the one or more computers to perform operations comprising:

sending, by the one or more computers and to a first computing device associated with a first identifier, a request for a transaction ticket that (i) is associated with a location identifier assigned for a time of service by a merchant, and (ii) was matched with an order that is associated with the location identifier, the request having a generic data format that, when received by any of a plurality of different computing devices including the first computing device, causes the computing device to translate, using a device specific library, at least a portion of the request that is in the generic data format into one or more device specific queries that are not in the generic data format to obtain requested data from memory included in the computing device, at least some of the plurality of different computing devices having different device specific libraries;

receiving, from the first computing device, ticket data that (a) was translated to the generic data format by the first computing device after the first computing device obtained the requested data from the memory included in the first computing device and (b) comprises data for one or more items in a transaction ticket transmitting, by one or more computers and to a second first computing device associated with a second identifier, the ticket data, wherein the second computing device is determined using the location identifier;

in response to transmitting the ticket data, receiving, by the one or more computers and from the second computing device, a request to pay a payment amount based on the ticket data; and transmitting, by the one or more computers and to a payment system, a payment transaction comprising the payment amount, the second identifier indicating a payer of the payment transaction, and the first identifier indicating a beneficiary of the payment transaction.

* * * * *